United States Patent
Akimoto et al.

(10) Patent No.: US 11,327,691 B2
(45) Date of Patent: May 10, 2022

(54) DELIVERY SYSTEM, METHOD OF CONTROLLING DELIVERY SYSTEM TO REQUEST FOR MAKING CONTRACT RELATED TO DELIVERY OF CONSUMABLE USED IN PRINTING APPARATUS

(71) Applicant: CANON KABUSHIKI KAISHA, Tokyo (JP)

(72) Inventors: Naoto Akimoto, Kashiwa (JP); Kensuke Kawajiri, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/732,919

(22) Filed: Jan. 2, 2020

(65) Prior Publication Data

US 2020/0225885 A1    Jul. 16, 2020

(30) Foreign Application Priority Data

Jan. 16, 2019 (JP) .............................. JP2019-005423
Apr. 18, 2019 (JP) .............................. JP2019-079566

(51) Int. Cl.
*G06F 3/12* (2006.01)
*H04N 1/00* (2006.01)
*G03G 15/00* (2006.01)

(52) U.S. Cl.
CPC ............ *G06F 3/121* (2013.01); *G06F 3/1219* (2013.01); *G06F 3/1235* (2013.01); *G06F 3/1286* (2013.01); *H04N 1/00954* (2013.01); *G03G 15/553* (2013.01); *H04N 1/00363* (2013.01)

(58) Field of Classification Search
None
See application file for complete search history.

(56) References Cited

U.S. PATENT DOCUMENTS

| | | | |
|---|---|---|---|
| 7,529,765 B2 * | 5/2009 | Brants | G06F 40/30 |
| 2002/0049839 A1 * | 4/2002 | Miida | G06F 3/1204 |
| | | | 709/224 |
| 2004/0066532 A1 * | 4/2004 | Matsugi | G06Q 30/02 |
| | | | 358/1.15 |

(Continued)

FOREIGN PATENT DOCUMENTS

| | | |
|---|---|---|
| JP | 2009086805 A | 4/2009 |
| JP | 2018097833 A | 6/2018 |
| JP | 2018190155 A | 11/2018 |

*Primary Examiner* — Haris Sabah
(74) *Attorney, Agent, or Firm* — Venable LLP

(57) ABSTRACT

A delivery system including an information processing apparatus operated by a user, a printing apparatus and a server that instructs delivery of a consumable of the printing apparatus. The information processing apparatus requests screen information for making a contract related to the delivery of the consumable to the server, displays a screen based on the screen information received from the server, and transmit registration information input on the screen to the server. The server creates the screen information and transmits the screen information to the information processing apparatus, makes a contract of the delivery of the consumable to be used in the printing apparatus with the user, based on the registration information, and delivers the consumable to the user when a remaining amount of the consumable is less than a predetermined amount in the printing apparatus.

25 Claims, 19 Drawing Sheets

(56) References Cited

U.S. PATENT DOCUMENTS

| | | | | |
|---|---|---|---|---|
| 2006/0221387 | A1* | 10/2006 | Swift | G06Q 10/06 |
| | | | | 358/1.15 |
| 2012/0176636 | A1* | 7/2012 | Ormond | G03G 15/5079 |
| | | | | 358/1.13 |
| 2013/0028616 | A1* | 1/2013 | Kunihiro | G06F 3/1229 |
| | | | | 399/27 |
| 2013/0169996 | A1* | 7/2013 | McLeod | G06F 3/1204 |
| | | | | 358/3.28 |
| 2014/0029038 | A1* | 1/2014 | Bovenzi | G06Q 10/06 |
| | | | | 358/1.14 |
| 2014/0091135 | A1* | 4/2014 | Burke, Jr | G06Q 10/20 |
| | | | | 235/375 |
| 2018/0165751 | A1* | 6/2018 | Chiyo | G06F 3/1235 |
| 2019/0146730 | A1* | 5/2019 | Zhu | B41J 15/044 |
| | | | | 358/1.9 |

\* cited by examiner

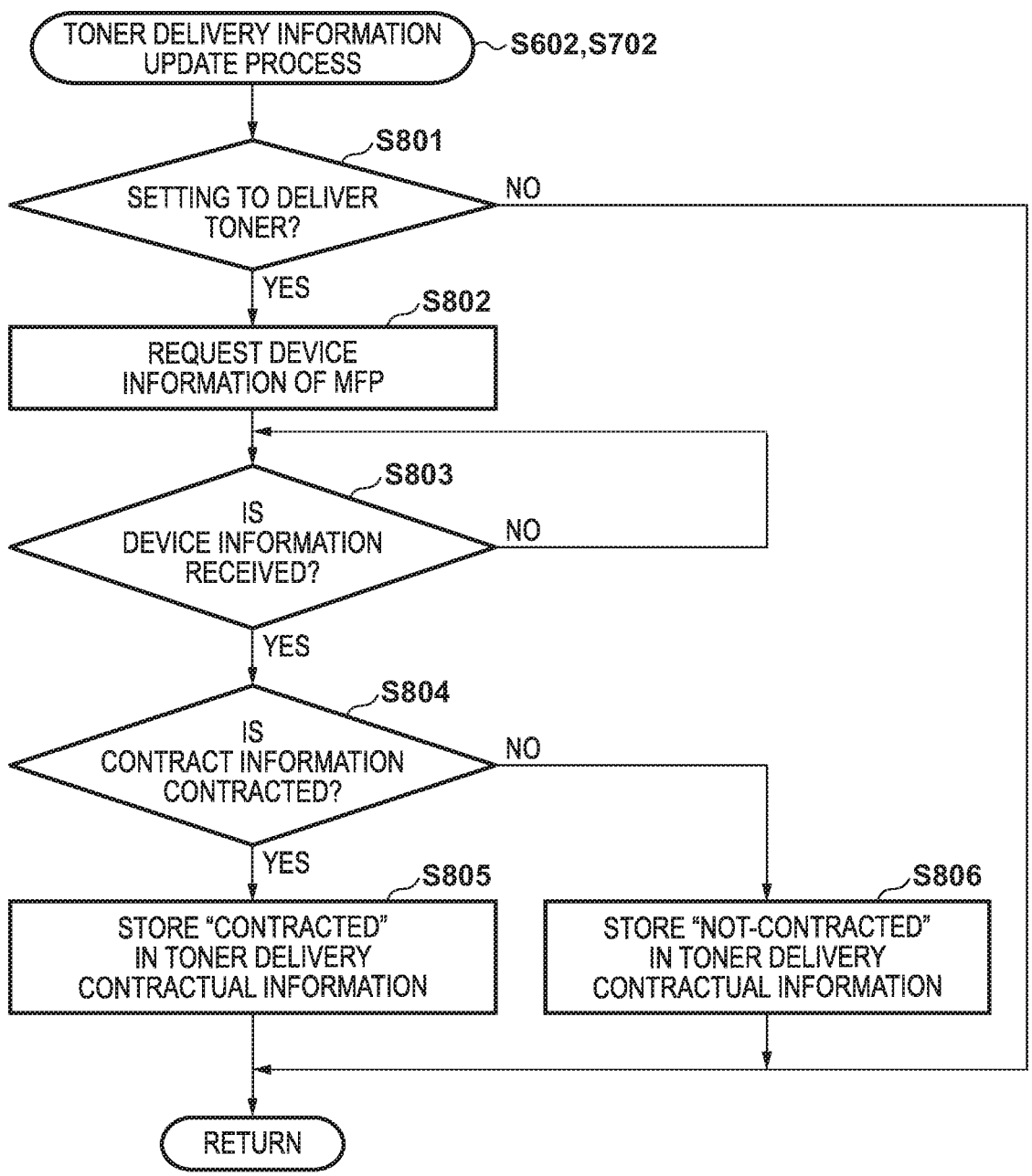

PROCEDURE OF REGISTERING WITH TONER DELIVERY SERVICE

..................................................................................
..................................................................................
..................................................................................
.............................................................
..................

PLEASE READ QR CODE WITH SMARTPHONE TO ACCESS
TO WEBSITE OF THE TONER DELIVERY SERVICE

.................................................... —912

..................................................................
..................................................................................
..................................................................................
.......................................................
............................
..........................
..................................................................................
...................
................................
.........................................
..................................................................................
....................................

| | |
|---|---|
| USA | 1801 |
| MFP123 | 1802 |
| AAA0000123 | 1803 |
| 1234 | 1804 |
| FULL | 1805 |
| 1 | 1806 |

DELIVERY SYSTEM, METHOD OF CONTROLLING DELIVERY SYSTEM TO REQUEST FOR MAKING CONTRACT RELATED TO DELIVERY OF CONSUMABLE USED IN PRINTING APPARATUS

BACKGROUND OF THE INVENTION

Field of the Invention

The present invention relates to a delivery system, a method of controlling a delivery system, an information processing apparatus, a method of controlling an information processing apparatus, and a storage medium.

Description of the Related Art

For example, a printing apparatus that receives an instruction from a personal computer to print information, such as desired characters and images, on a sheet type recording medium, such as a paper and a film, in accordance with an electrophotographic method has been known. In such a printing apparatus, a developing agent, such as toner and ink, is used to form an image on a recording medium. Therefore, when necessary, a user needs to purchase and replace consumables, such as a cartridge or a developing device containing a developing agent, or a process cartridge integrally containing a charger, a photosensitive drum, and a developing device. To save user's time and labor concerning the purchase of a consumable as described above, a service of automatically placing an order of a consumable with a predetermined supplier to have the consumable delivered has been known. There is also a service of automatically placing an order of a consumable when a remaining amount of a consumable becomes equal to or less than a predetermined threshold (hereinafter described as toner low). See Japanese Patent Laid-Open No. 2009-86805.

However, to receive such a service of an automatic order and delivery system for a consumable, in many cases, a contract needs to be made with a service providing company (mainly, a sales company of a printing apparatus). A contract of the automatic order and delivery system for a consumable can be made when a printing apparatus is purchased, or after a printing apparatus is purchased. When a printing apparatus is purchased, however, a contract of the automatic order and delivery system for a consumable may not be made, due to the lack of relevant knowledge because the printing apparatus is not yet used. After a purchase, a contract may not be made for the reasons that the presence of the automatic order and delivery system for a consumable is forgotten or how to make a contract is obscure even if it is remembered. As described above, there has been a problem that the automatic order and delivery system for a consumable may not be often actually used despite the presence of the system.

There is also a printing apparatus that enables placing an order of a consumable by displaying a consumable order button on a display unit of the printing apparatus when toner low occurs, without a requirement of making a contract of the automatic order and delivery system for a consumable. With such a printing apparatus, a user needs to perform operation of placing an order every time toner low occurs, and thus there has been a problem that operation may be complicated and that whether or not an order has been placed may be uncertain.

SUMMARY OF THE INVENTION

An aspect of the present invention is to eliminate the above-mentioned problem with conventional technology.

A feature of the present invention is to provide a technique that can increase the number of users of a consumable delivery system and can enhance convenience for contracted users.

According to a first aspect of the present invention, there is provided a delivery system including an information processing apparatus that is to be operated by a user and a printing apparatus, and a server that instructs delivery of a consumable to be used in the printing apparatus, wherein the information processing apparatus comprising: a reader that reads a code output by the printing apparatus; a first memory device that stores instructions; and at least one first processor that executes the instructions stored in the first memory device to cause the image processing apparatus to function as: a request unit configured to request screen information for making a contract related to the delivery of the consumable to the server, based on information included in the code read by the reader; a display unit configured to display a screen based on the screen information transmitted from the server in response to a request made by the request unit; and a transmission unit configured to transmit registration information input on the screen to the server, and wherein the server includes: a second memory device that stores instructions; and at least one second processor that executes the instructions stored in the second memory device to cause the server to function as: a unit configured to create the screen information in response to the request and transmit the screen information to the information processing apparatus; a contract unit configured to make a contract of the delivery of the consumable to be used in the printing apparatus with the user, based on the registration information; and a delivery unit configured to deliver the consumable to the user when a remaining amount of the consumable is less than a predetermined amount in the printing apparatus.

According to a second aspect of the present invention, there is provided an information processing apparatus comprising: a reader that reads a code output by a printing apparatus; a memory device that stores instructions; and at least one processor that executes the instructions stored in the memory device to cause the image processing apparatus to function as: a request unit configured to request screen information for making a contract related to delivery of a consumable used in the printing apparatus from a server, based on information included in the code read by the reader; a display unit configured to display a screen based on the screen information transmitted from the server in response to a request made by the request unit; and a transmission unit configured to transmit registration information input on the screen to the server.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 8 is a flowchart for describing a toner delivery information update process of step S602 of FIG. 6 or S702 of FIG. 7.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

Figure 1:
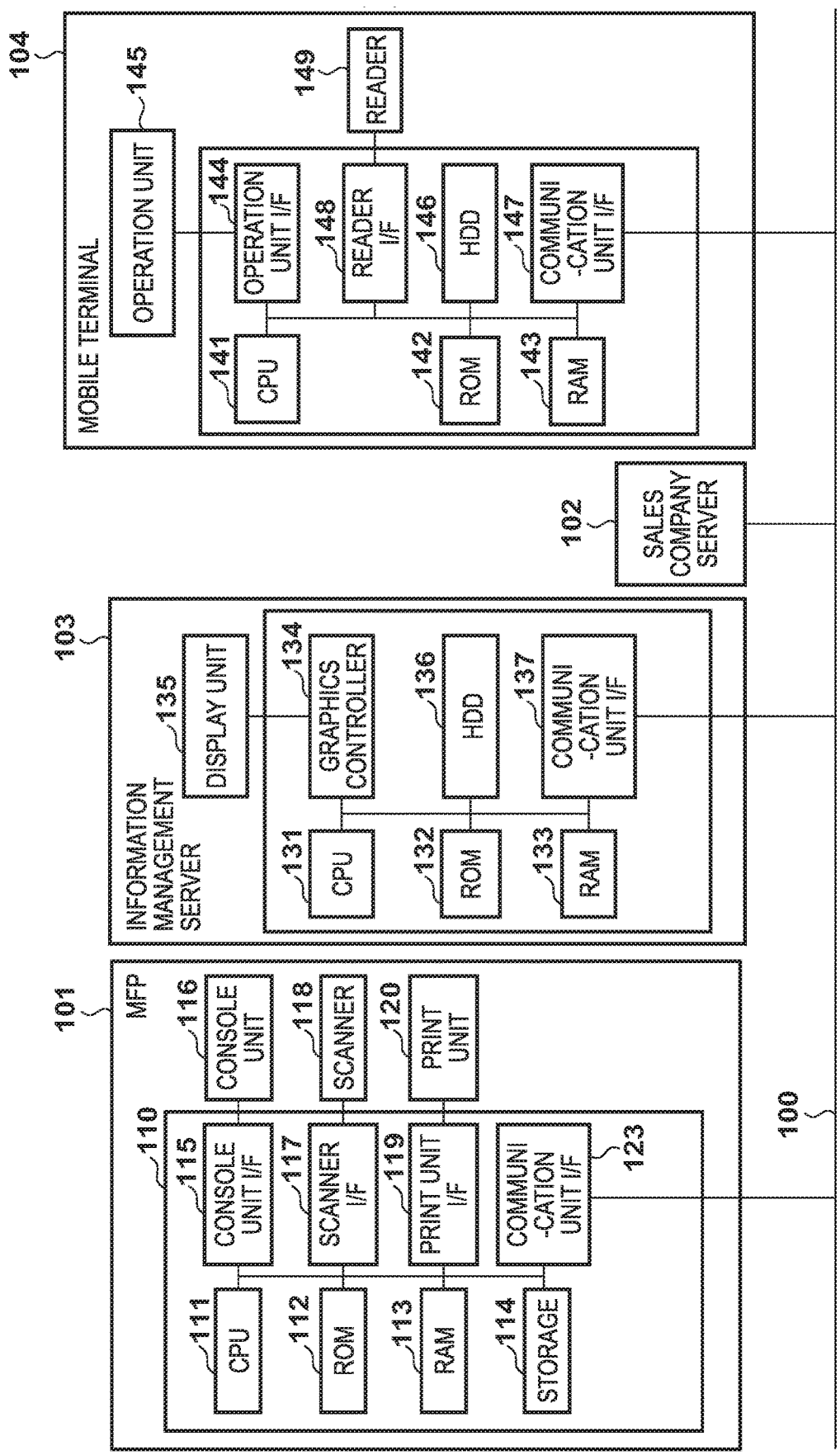
FIG. 1 is a block diagram for describing a hardware configuration of a toner delivery system including a printing apparatus according to an embodiment of the present invention.

FIG. 1 is a block diagram for describing a hardware configuration of a toner delivery system including a printing apparatus according to an embodiment of the present invention. Note that the printing apparatus will be described with an example of a multi-function peripheral (hereinafter "MFP") having a print function, a copy function, a facsimile function, a scan function, and the like. However, the present invention is not limited to such a multi-function peripheral and may be, for example, a printing apparatus having only a print function.

The toner delivery system includes an MFP 101, an information management server (data management server) 103, a sales company server 102, and a mobile terminal (information processing apparatus) 104, and these are communicably connected via a network 100. Note that an example of a case where the toner delivery system includes the MFP 101 and the information management server 103 is illustrated but not restricted to this. Note that the mobile terminal 104 is herein wirelessly connected to the network 100.

First, a configuration of the information management server 103 will be described.

The information management server 103 includes a central processing unit (CPU) 131, a ROM 132, a RAM 133, a graphics controller 134, a display unit 135, and a hard disk drive (HDD) 136. The information management server 103 further includes a communication unit interface (an interface is hereinafter described as "I/F") 137, and each configuration unit is communicably connected via a bus. The CPU 131 integrally controls the information management server 103. The CPU 131 executes various processes by deploying a program stored in the ROM 132 or the HDD 136 in the RAM 133, and then executing the deployed program. The ROM 132 stores a system program and the like that are used to control the information management server 103. The graphics controller 134 generates a screen to be displayed on the display unit 135. The HDD 136 has a function as a storage area and stores an application program that executes various processes, for example. The HDD 136 is an example of a storage apparatus. Other than the HDD, a solid-state drive (SSD) or the like may be used. The communication unit I/F 137 is an interface for connecting various devices to the information management server 103. For example, via the communication unit I/F 137, a display, a keyboard, a pointing device, and the like can be connected to the information management server 103. The communication unit I/F 137 communicates with the MFP 101 and the like via the network 100, based on the control of the CPU 131.

Next, a configuration of the mobile terminal 104 will be described.

The mobile terminal 104 includes a CPU 141, a ROM 142, a RAM 143, an operation unit 145, an HDD 146, and a reader 149 such as a camera. The reader 149 is controlled by the CPU 141 via a reader I/F 148. The operation unit 145 is controlled by the CPU 141 via an operation unit I/F 144. The mobile terminal 104 further includes a communication unit interface 147, and each configuration unit is communicably connected via a bus. The CPU 141 integrally controls the mobile terminal 104. The CPU 141 executes various processes by deploying a program stored in the ROM 142 or the HDD 146 in the RAM 143 and then executing the deployed program. The ROM 142 stores a system program and the like that are used to control the mobile terminal 104. The operation unit I/F 144 executes a process of receiving an input to the operation unit 145 and a process for screen display, for example. The HDD 146 has a function as a storage area and stores an application program that executes various processes, for example. The HDD 146 is an example of a storage apparatus. Other than the HDD, an SSD or the like may be used. The communication unit I/F 147 is an interface for connecting various devices to the mobile terminal 104. The communication unit I/F 147 communicates with the MFP 101 and the like via the network 100, based on the control of the CPU 141.

Next, a configuration of the MFP 101 will be described.

The MFP 101 has a scan function of scanning an image on a sheet and a print function of printing an image on a sheet. Besides the above functions, the MFP 101 also has a file transmission function of transmitting image data to an external apparatus, for example. Note that, in the embodiment, the MFP 101 will be described as an example of an image processing apparatus but not restricted to this. For example, a printing apparatus such as a printer not having a scan function may be used. In the embodiment, as an example, it is assumed that the printing apparatus includes various configuration requirements described below.

A control unit 110 including a CPU 111 controls overall operation of the MFP 101. The CPU 111 performs various types of control, such as scan control and print control, by deploying a control program stored in a ROM 112 or a storage 114 in a RAM 113 and then executing the deployed program. The ROM 112 stores a control program that can be executed in the CPU 111. The RAM 113 is a main storage memory of the CPU 111 and is used as a work area or a temporary storage area for deploying various control programs stored in the ROM 112 and the storage 114. The storage 114 stores print data, image data, various programs, and various pieces of setting information. Note that, in the MFP 101 of the embodiment, it is assumed that one CPU 111 executes each process described in the flowchart to be described later by using one memory (RAM 113), but another aspect may be employed instead. For example, each process described in the flowchart to be described later can be executed by a plurality of CPUs, RAMs, ROMs, and storages in cooperation. A part of the process may be executed by using a hardware circuit, such as an application specific integrated circuit (ASIC) and a field-programmable gate array (FPGA).

A console unit I/F 115 connects a console unit 116 and the control unit 110. The console unit 116 displays a screen and includes a touch panel display that can even receive an input instruction; and a hardware key input unit. A scanner I/F 117 connects a scanner 118 and the control unit 110. The scanner 118 scans an image on a sheet and generates image data. The image data generated by the scanner 118 is transmitted to an external apparatus via the network 100 or printed on a sheet. The scanner 118 can also scan sheets placed on and fed from a document feeder (not illustrated) and can thereby scan a plurality sheets of document. A print unit I/F 119 connects a print unit 120 and the control unit 110. Image data to be printed is transferred from the control unit 110 to the print unit 120 via the print unit I/F 119. The print unit 120 receives a control command and image data to be printed via the control unit 110 and prints an image based on the image data on a sheet.

A print method of the print unit 120 may be an electrophotographic method or may be an ink-jet method. In a case of the electrophotographic method, an image is formed by forming an electrostatic latent image on a photosensitive member, developing the latent image with toner, transferring the toner image onto a sheet, and fixing the transferred toner image. In contrast, in a case of the ink jet method, an image is printed on a sheet by ejecting ink. Consumables used in printing, such as a toner cartridge and an ink cartridge used in the print unit 120, are removably attached to the inside of the MFP 101. A user can replenish these consumables by replacing cartridges. Note that the CPU 111 obtains an amount of remaining consumables necessary for printing at periodic timing, at timing when printing of one page of an image is finished or at timing when a cartridge is attached, and stores the obtained amount of remaining toner in the RAM 113 or the storage 114. When a cartridge is attached, the CPU 111 stores a model number of the cartridge in the RAM 113 or the storage 114.

The control unit 110 is connected to the network 100 via a communication unit I/F 123. The communication unit I/F 123 obtains, from the information management server 103 on the network 100, information of a support service to which the MFP 101 subscribes. The communication unit I/F 123 receives print data and information from a PC (not illustrated) on the network 100 and transmits information that is stored in the RAM 113 or the storage 114 and that is associated with consumables, such as the amount of remaining toner and the model number of a cartridge. The print data received via the communication unit I/F 123 is analyzed by a software module (PDL analyzer, not illustrated) for analyzing print data stored in the storage 114 or the ROM 112. The PDL analyzer generates data to be printed by the print unit 120, based on print data expressed by various types of page description languages.

Figure 2:
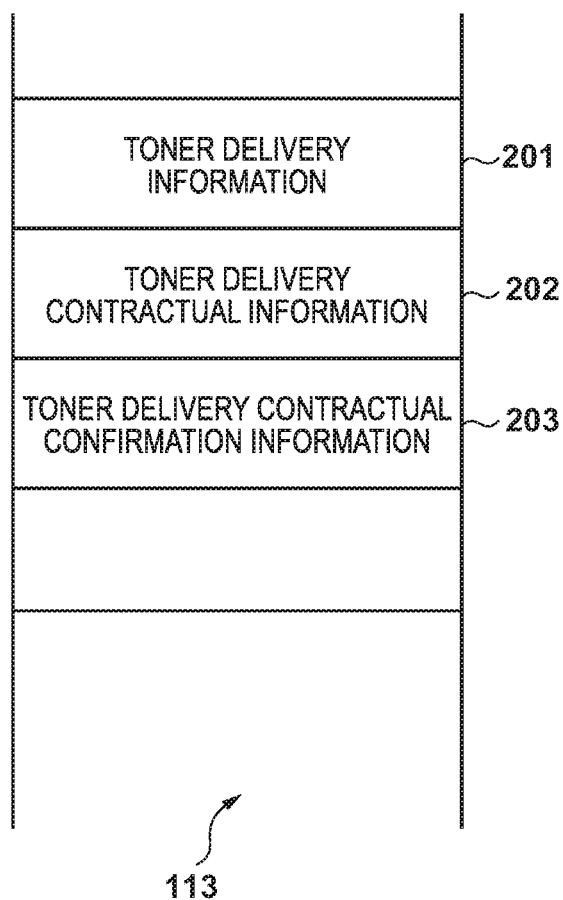
FIG. 2 is a diagram for describing a data configuration of a RAM of an MFP according to the embodiment.

FIG. 2 is a diagram for describing a data configuration of the RAM 113 of the MFP 101 according to the embodiment.

The RAM 113 is used as an area for storing various status values and setting values of the MFP 101. The following description will be given based on an assumption that toner is used as a consumable. In the RAM 113, toner delivery information 201, toner delivery contractual information 202, and toner delivery contractual confirmation information 203 are present. The toner delivery information 201 is an area storing information of user's selection as to whether or not to subscribe to automatic toner delivery. The automatic toner delivery is a system of placing an automatic order of toner to have toner delivered to a user, when the amount of remaining toner is running short. A default value is "unsubscribed" from automatic toner delivery.

The toner delivery contractual information 202 is an area storing information indicating whether or not a user has made a contract of automatic toner delivery. In the information, any one of "not set", "contracted", and "non-contracted" is present. "Not set" indicates that there is no information related to a contract of automatic toner delivery. "Contracted" indicates that information that a user is on a contract of automatic toner delivery is obtained from the information management server 103. "Non-contracted" indicates that information that a user is not on a contract of automatic toner delivery is obtained from the information management server 103. A default value is "not set".

The toner delivery contractual confirmation information 203 is an area storing information indicating whether or not user's intention of not making a contract is expressed on a screen for recommending and confirming an automatic toner delivery contract to be described later in the embodiment. In the information, either a case of "contract intention confirmed", where intention of not making a contract has been received, or a case of "unconfirmed", where no intention has been received, is present. A default value is "unconfirmed".

Figure 3:
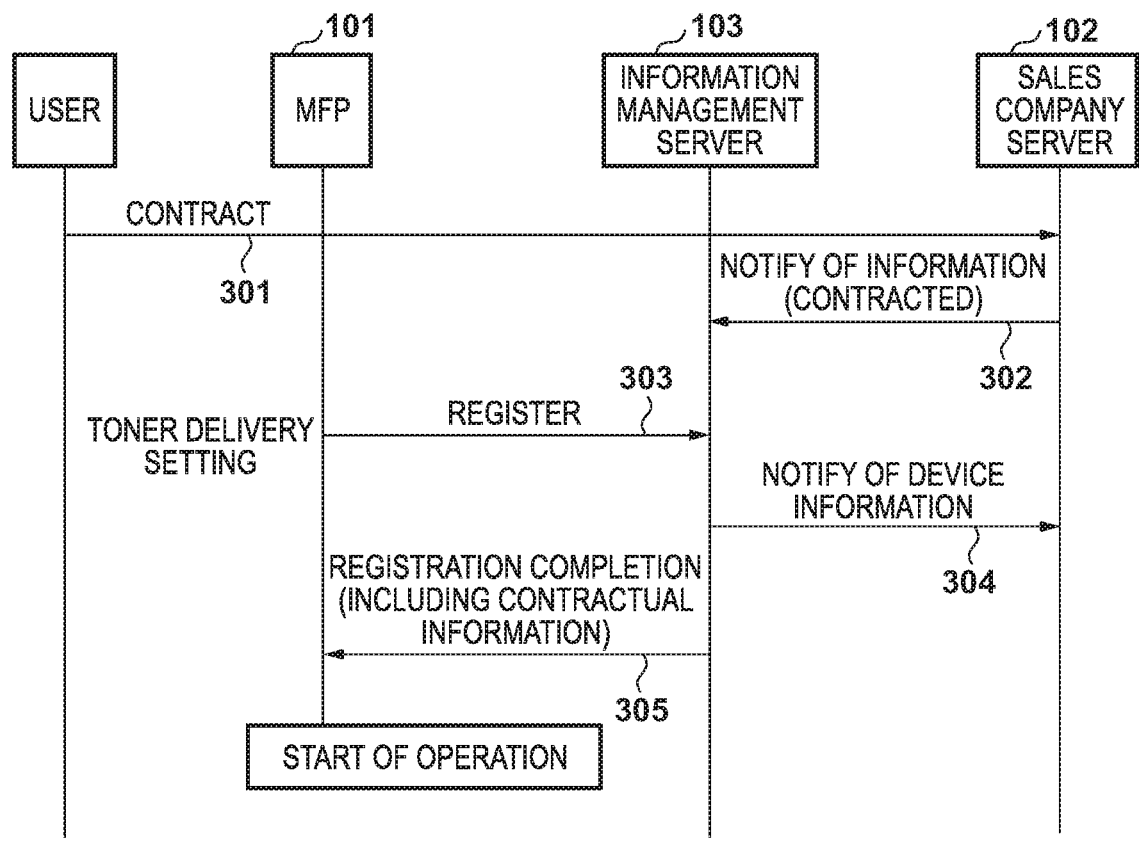
FIG. 3 is a sequence diagram for describing a flow of a process in the toner delivery system according to the embodiment.

FIG. 3 is a sequence diagram for describing a flow of a process in the toner delivery system according to the embodiment. Here, a flow from a contract to the start of operation is illustrated.

When a user purchases the MFP 101, for example, in 301, the user makes a contract with the toner delivery system at the time of the purchase. The contract may be an application made on a document, or contract application operation on the Web. Information of the contract includes an ID number (identification information) of the MFP 101. The information of the contract is transmitted to the sales company server 102 and is registered in the sales company server 102. At the same time, in 302, the sales company server 102 notifies the information management server 103 of the information of the contract. The information includes information indicating "contracted". The information notified as described above is stored in the information management server 103.

Next, on the MFP 101, the user performs operation of starting automatic toner delivery. The operation of starting automatic toner delivery is in a setting menu of a home screen of the MFP 101, and the item "automatic toner delivery" is set to "deliver". A detailed process of the MFP 101 when the operation of automatic toner delivery setting is performed will be described later with reference to FIG. 5.

When "automatic toner delivery" is set to "deliver" as described above, in 303, the MFP 101 requests the information management server 103 to register automatic toner delivery. The registration includes an ID of the MFP 101.

The information management server 103 that has received the request of the registration stores the registered information in the information management server 103. Then, in 304, the information management server 103 notifies the sales company server 102 of device information including the ID of the MFP 101 that has been registered. In 305, the information management server 103 notifies the MFP 101 of registration completion. In the registration completion, the ID of the MFP 101 notified in the request of the registration in 303 is compared with data in the information management server 103. Based on the information of the contract notified in 302, whether or not a contract has been made is known, and therefore the registration completion includes information indicating whether or not a contract has been made. The MFP 101 stores the contract information included in the registration completion and therefore determines whether or not the registered information of the contract and the information of the registration of the automatic toner delivery setting match the information included in the registration completion. In a case where these match, the toner delivery system starts operation.

Figure 4:
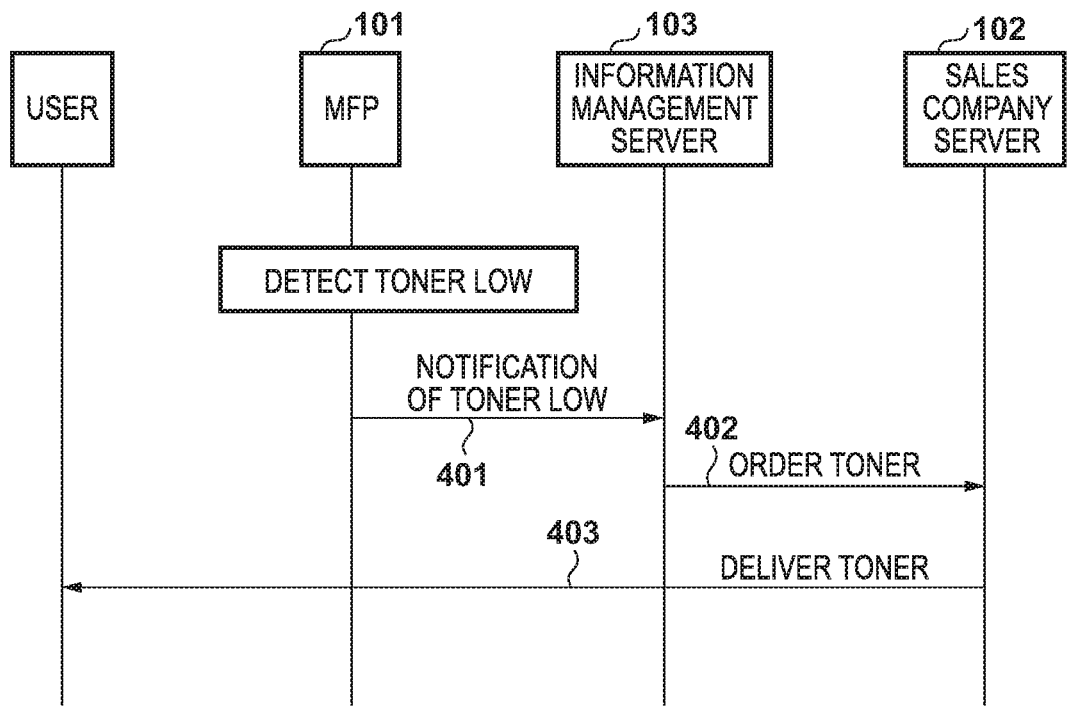
FIG. 4 is a sequence diagram for describing a procedure of operation of placing an order in the toner delivery system according to the embodiment.

FIG. 4 is a sequence diagram for describing a procedure of operation of placing an order in the toner delivery system according to the embodiment.

When the amount of remaining toner is less than a predetermined amount in the MFP 101, in 401, the MFP 101 notifies the information management server 103 of toner low (only a small amount of toner is left). In 402, the information management server 103 that has received the notification of toner low places an order for toner with the sales company server 102. In 403, the sales company server 102 that has received the order arranges the ordered toner and gives an instruction such that toner is delivered to a registered address. In this manner, toner is delivered from the sales company to the user of the MFP 101.

Figure 5:
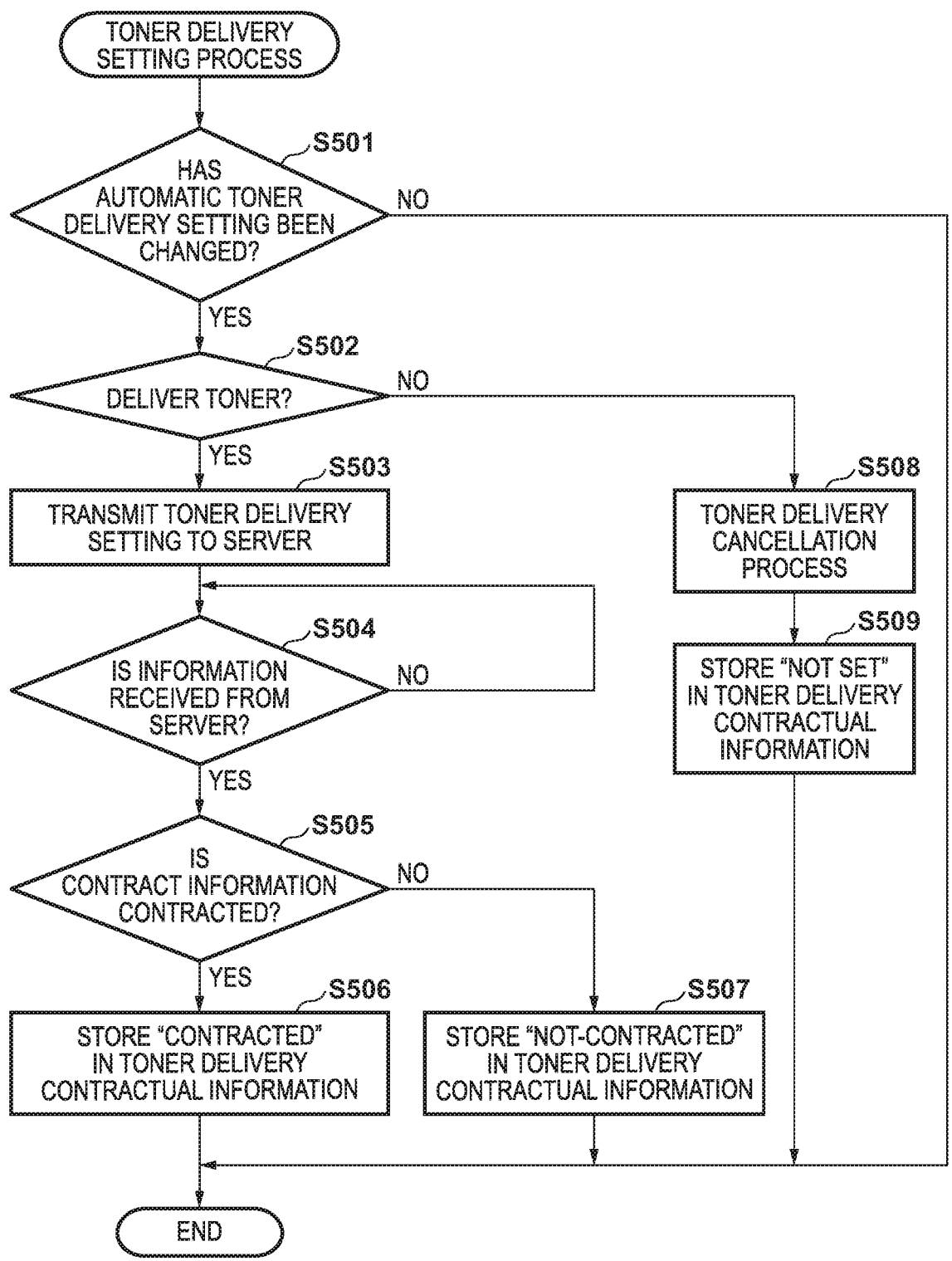
FIG. 5 is a flowchart for describing an automatic toner delivery setting process in the MFP according to the embodiment.

FIG. 5 is a flowchart for describing an automatic toner delivery setting process in the MFP 101 according to the embodiment. Note that the process described in the flowchart is achieved when the CPU 111 executes a program deployed in the RAM 113.

The automatic toner delivery setting is a setting present in a setting menu of a home screen of the console unit 116. In step S501, the CPU 111 determines whether or not the automatic toner delivery setting has been changed. In a case where the automatic toner delivery setting is changed, the process proceeds to step S502; otherwise, the process is terminated. In step S501, the CPU 111 compares a value of the automatic toner delivery setting set in the setting menu described above and a value stored in the toner delivery information 201 of the RAM 113 and examines whether or not the value of the automatic toner delivery setting has been changed.

In step S502, the CPU 111 determines whether or not the automatic toner delivery setting after a change is set to "deliver toner". Here, in a case where the CPU 111 determines that the automatic toner delivery setting after a change is set to "deliver toner", the process proceeds to step S503, and the CPU 111 transmits start of automatic toner delivery setting to the information management server 103 and applies for the start of automatic toner delivery. Next, the process proceeds to step S504, and the CPU 111 waits to receive information from the information management server 103. In a case that the CPU 111 receives information, the process proceeds to step S505, and the CPU 111 determines whether or not the contract information of the toner delivery system included in the received information is "contracted". Here, in a case where the CPU 111 determines that the contract information is "contracted", the process proceeds to step S506, and the CPU 111 stores "contracted" in the toner delivery contractual information 202 of the RAM 113, stores other information as well, and terminates the process.

On the other hand, in step S505, in a case where the CPU 111 determines that the information of the contract is not "contracted", i.e., "not contracted", the process proceeds to step S507. In step S507, the CPU 111 stores "non-contracted" in the toner delivery contractual information 202 of the RAM 113, stores other information as well, and terminates the process.

In step S502, in a case where the automatic toner delivery setting after a change is not set to "deliver toner", the CPU 111 makes the process proceed to step S508. In step S508, the CPU 111 clears inside information for setting automatic toner delivery and performs an automatic toner delivery cancellation process. Subsequently, the process proceeds to step S509, and the CPU 111 stores "not set" in the toner delivery contractual information 202 of the RAM 113 and terminates the process.

Figure 6:
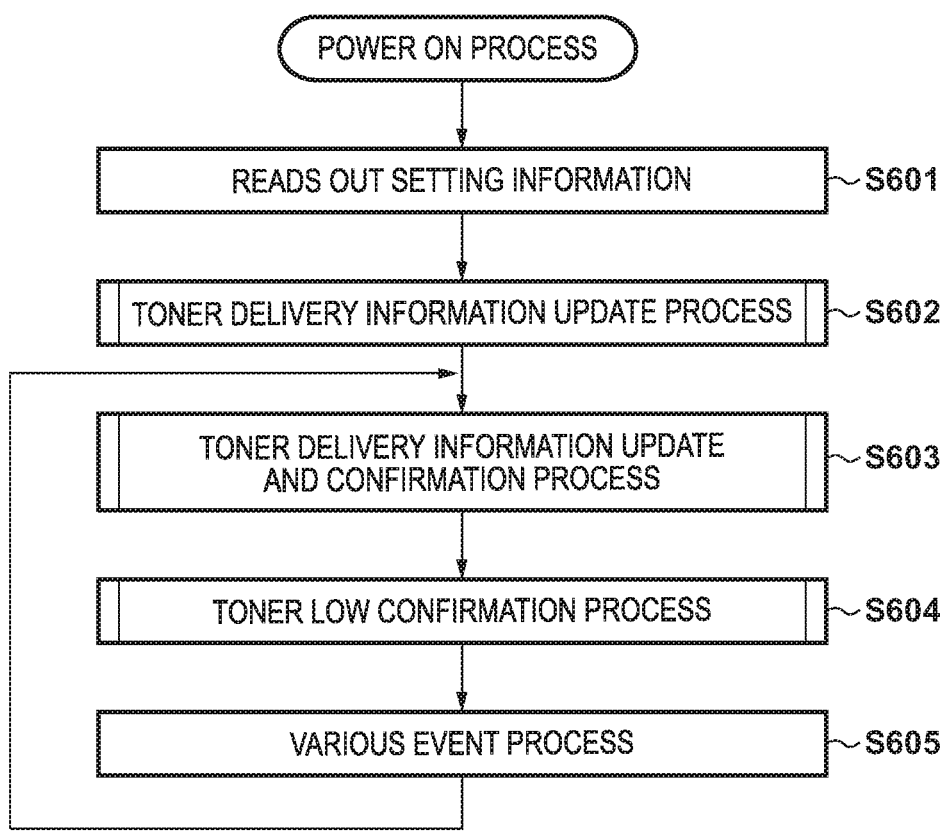
FIG. 6 is a flowchart for describing a process in the MFP from the time when power is turned on according to the embodiment.

FIG. 6 is a flowchart for describing a process in the MFP 101 from the time when power is turned on according to the embodiment. Note that the process described in the flowchart is achieved when the CPU 111 executes a program deployed in the RAM 113.

In step S601, the CPU 111 reads out apparatus setting information from setting information of the apparatus stored in the RAM 113 and stores the apparatus setting information in the RAM 113. Next, the process proceeds to step S602, and the CPU 111 performs a toner delivery information update process. Details of the toner delivery information update process will be described later with reference to the flowchart of FIG. 8.

Next, the process proceeds to step S603, and the CPU 111 performs a toner delivery information update and confirmation process of confirming update of the toner delivery information. Details of the toner delivery information update and confirmation process will be described later with reference to the flowchart of FIG. 7.

Next, the process proceeds to step S604, and the CPU 111 performs a toner low confirmation process of confirming whether or not toner low has occurred. Details of the toner low confirmation process will be described later with reference to the flowchart of FIG. 9A.

Then, the process proceeds to step S605, and the CPU 111 performs a process corresponding to various events. Among those, another process of the apparatus is performed. Then, the process returns to step S603, and the processes of step S603 to step S605 are repeatedly and periodically executed.

Figure 7:
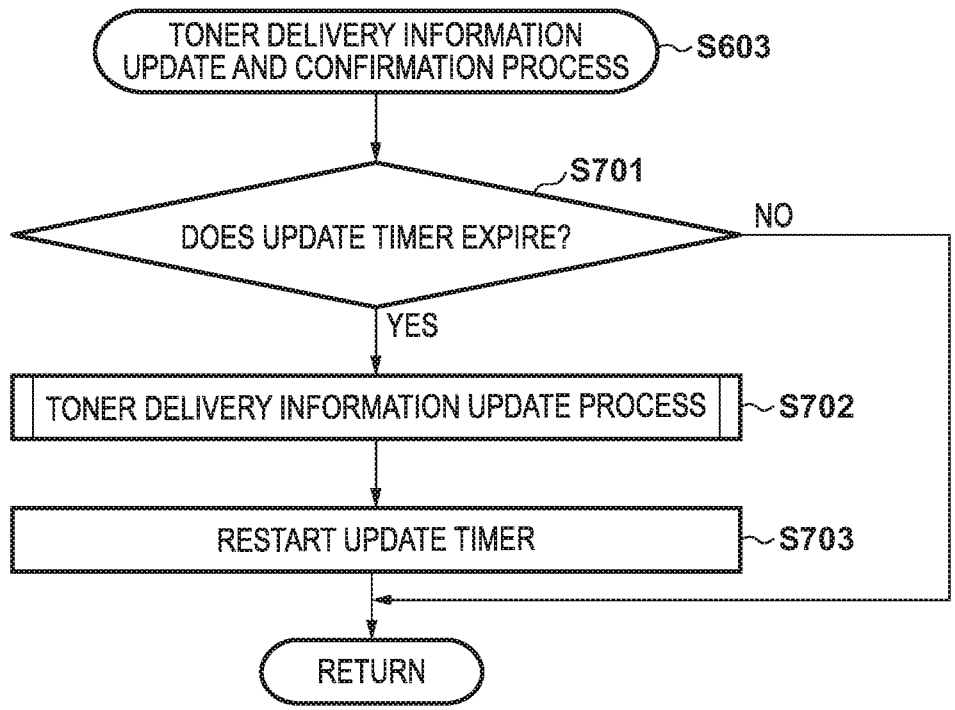
FIG. 7 is a flowchart for describing a toner delivery information update and confirmation process of step S603 of FIG. 6.

FIG. 7 is a flowchart for describing the toner delivery information update and confirmation process of step S603 of FIG. 6. The process is executed in every period that is set in an update timer (not illustrated).

In S701, the CPU 111 determines whether or not the update timer of the toner delivery information has expired. The update timer of the toner delivery information has a timer value of 24 hours, for example, and is started when the MFP 101 is turned on. In a case where the update timer of the toner delivery information expires, the process proceeds to S702, and the CPU 111 performs a toner delivery information update process similar to that in step S602. Details of the toner delivery information update process will be described later with reference to the flowchart of FIG. 8. Thus, in this case, the toner delivery information is updated every 24 hours.

Next, the process proceeds to S703, and the CPU 111 restarts the update timer of the toner delivery information with its value set to 24 hours and terminates the process. Also when the update timer of the toner delivery information does not expire in S701, the CPU 111 terminates the process.

In this manner, whether or not the toner delivery information is updated is checked once a day.

FIG. 8 is a flowchart for describing the toner delivery information update process of step S602 of FIG. 6 or S702 of FIG. 7.

First, in step S801, the CPU 111 determines whether or not the toner delivery information 201 of the RAM 113 is set to "deliver toner". Here, in a case where the toner delivery information 201 is set to "deliver toner", the process proceeds to step S802; otherwise, the process is terminated. In step S802, the CPU 111 requests device information of the MFP 101 for the information management server 103. Next, the process proceeds to step S803, and the CPU 111 waits for a response for the request from the information management server 103. In a case that the CPU 111 receives the response from the information management server in step S803, the process proceeds to step S804, and the CPU 111 determines whether or not the contract information of its own device in the received device information is "contracted". The information management server 103 receives contract information indicating whether or not each individual device is "contracted" from the sales company server 102 in advance, and therefore the contract information is included in the response received in step S803.

In this manner, in step S804, in a case where the CPU 111 determines that the contract information is "contracted", the process proceeds to step S805, stores "contracted" in the toner delivery contractual information 202 of the RAM 113, and terminates the process. On the other hand, in step S804, in a case where the CPU 111 determines that the contract information is not "contracted", the process proceeds to step S806, stores "non-contracted" in the toner delivery contractual information 202 of the RAM 113, and terminates the process.

Figure 9A:
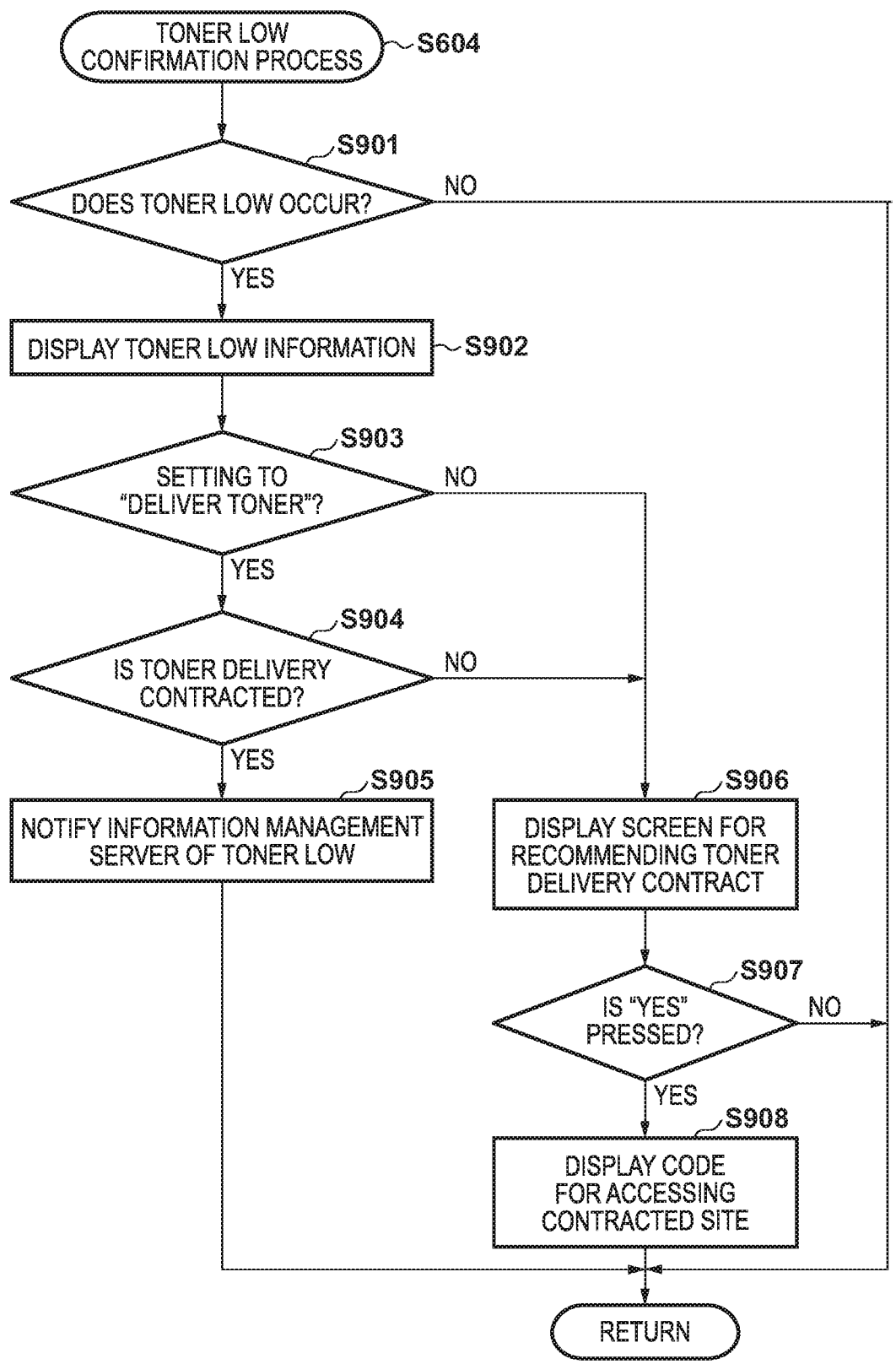
FIG. 9A is a flowchart for describing a toner low confirmation process of step S604 of FIG. 6.

FIG. 9A is a flowchart for describing the toner low confirmation process of step S604 of FIG. 6.

First, in step S901, the CPU 111 determines whether or not toner low, which is a state in which the amount of remaining toner of the MFP 101 is less than a specified value, occurs. Determination of the amount of remaining toner can be determined by detection using an optical sensor or by accumulated calculation of count values of the amount of used toner. In a case where toner low occurs, the process proceeds to step S902; otherwise, the process is terminated.

In step S902, the CPU 111 sets the occurrence of toner low to the display information inside the apparatus. Next, the process proceeds to step S903, and the CPU 111 determines whether or not the toner delivery information 201 of the RAM 113 is set to "deliver toner". Here, in a case where the CPU 111 determines that the toner delivery information 201 is set to "deliver toner", the process proceeds to step S904, and the CPU 111 determines whether or not or the toner delivery contractual information 202 of the RAM 113 is set to "contracted". Here, in a case where the CPU 111 determines that the toner delivery contractual information 202 is set to "contracted", this means that the MFP 101 is on a contract with the toner delivery system, thus the process proceeds to step S905, and the CPU 111 notifies the information management server 103 of toner low by transmitting the information of toner low and terminates the process. With this operation, the information management server 103 then arranges delivery of toner with a delivery company, based on the toner low information.

On the other hand, in a case where the toner delivery information 201 is not set to "deliver toner" in step S903, or in a case where the CPU 111 determines that the toner delivery contractual information 202 is not set to "contracted" in step S904, the process proceeds to step S906. In step S906, the CPU 111 displays a screen (FIG. 9B) for recommending a toner delivery contract on the console unit 116.

Figure 9C:
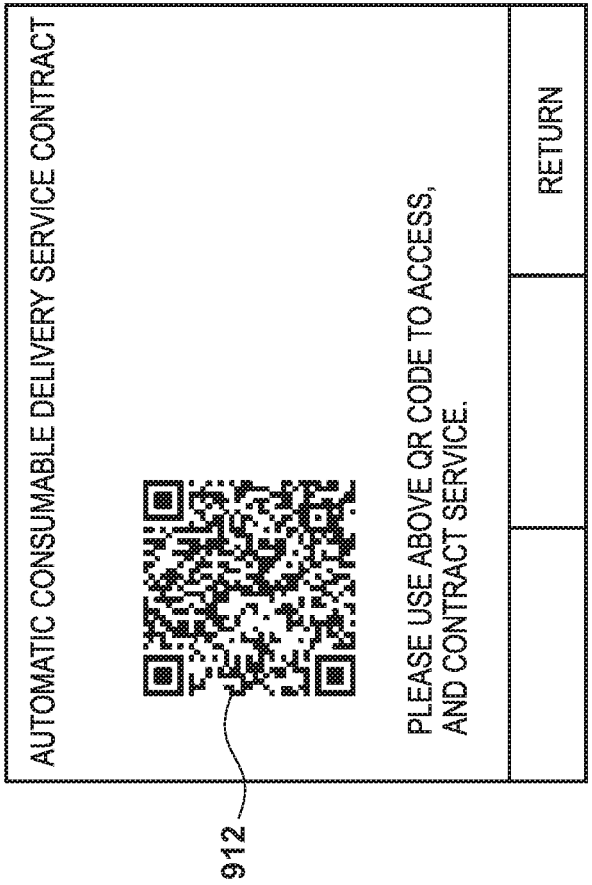
FIG. 9C depicts a view illustrating a screen example of a code for accessing a website where a contract can be made, which is displayed in step S908.
Figure 9B:
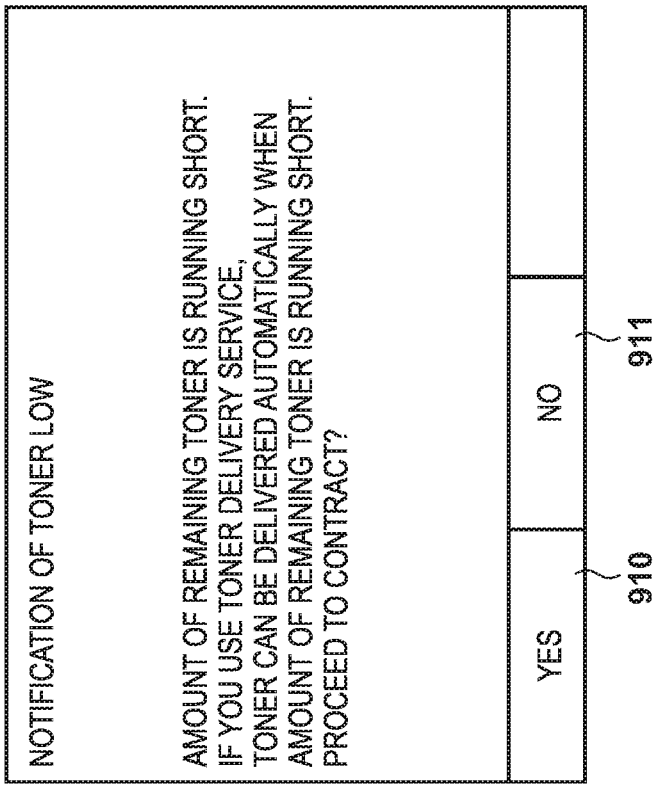
FIG. 9B depicts a view illustrating an example of a screen for recommending a toner delivery contract.

FIG. 9B is a diagram illustrating an example of the screen for recommending a toner delivery contract.

In this case, information indicating that the amount of remaining toner is running short and indicating that making a contract enables automatic toner delivery is provided, as a contract has not been made with the toner delivery system.

On the screen, a user can input a "Yes" button 910 or a "No" button 911, and the CPU 111 waits for an input.

In step S906, in a case where the CPU 111 determines that there is an input to either button, the process proceeds to step S907. In step S907, the CPU 111 determines whether or not the "Yes" button 910 indicating agreement on a contract is pressed. In a case that the "Yes" button 910 is pressed, the process proceeds to step S908, the CPU 111 displays a code for accessing a website of a contractor where a contract can be made, as shown in FIG. 9C, and terminates the process. On the other hand, in a case where the "No" button 911 is pressed in step S907, the process is directly terminated.

FIG. 9C is a diagram illustrating a screen example of the code for accessing the website of the contractor where a contract can be made, which is displayed in step S908.

In this case, a Uniform Resource Locator (URL) of the website where a contract can be made is displayed with a QR code$^{TR}$ (two-dimensional barcode) 912. When a user reads the QR code 912 with a smartphone or the like, the user can recognize the URL and access the website where a contract can be made with the smartphone or the like and can thereby make a contract with the toner delivery system. Note that, as well as a URL, the amount of remaining toner, setting information, and the like of the MFP 101 may be added to the QR code 912. Generation of the QR code 912 will be described later with reference to the flowchart of FIG. 14.

Also when "deliver toner" is not set in step S903, the CPU 111 makes the process proceeds to step S906, and the CPU 111 displays the screen (FIG. 9B) for recommending the toner delivery contract on the console unit 116. The process of step S906 and later is as described above.

Figure 10A:
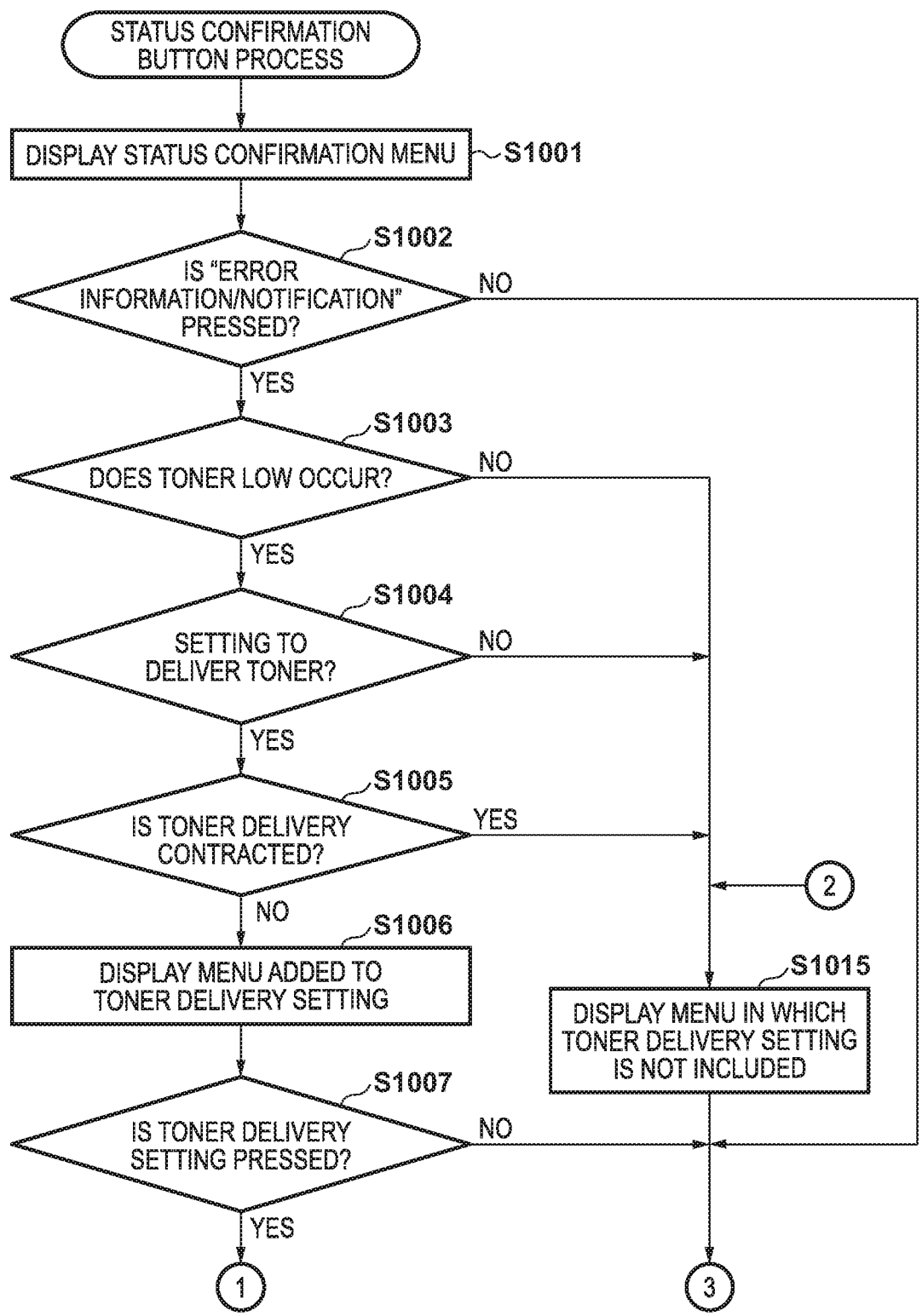
FIGS. 10A and 10B are flowcharts depicts a view a process when a status confirmation button of the MFP is pressed according to the embodiment.
Figure 10B:
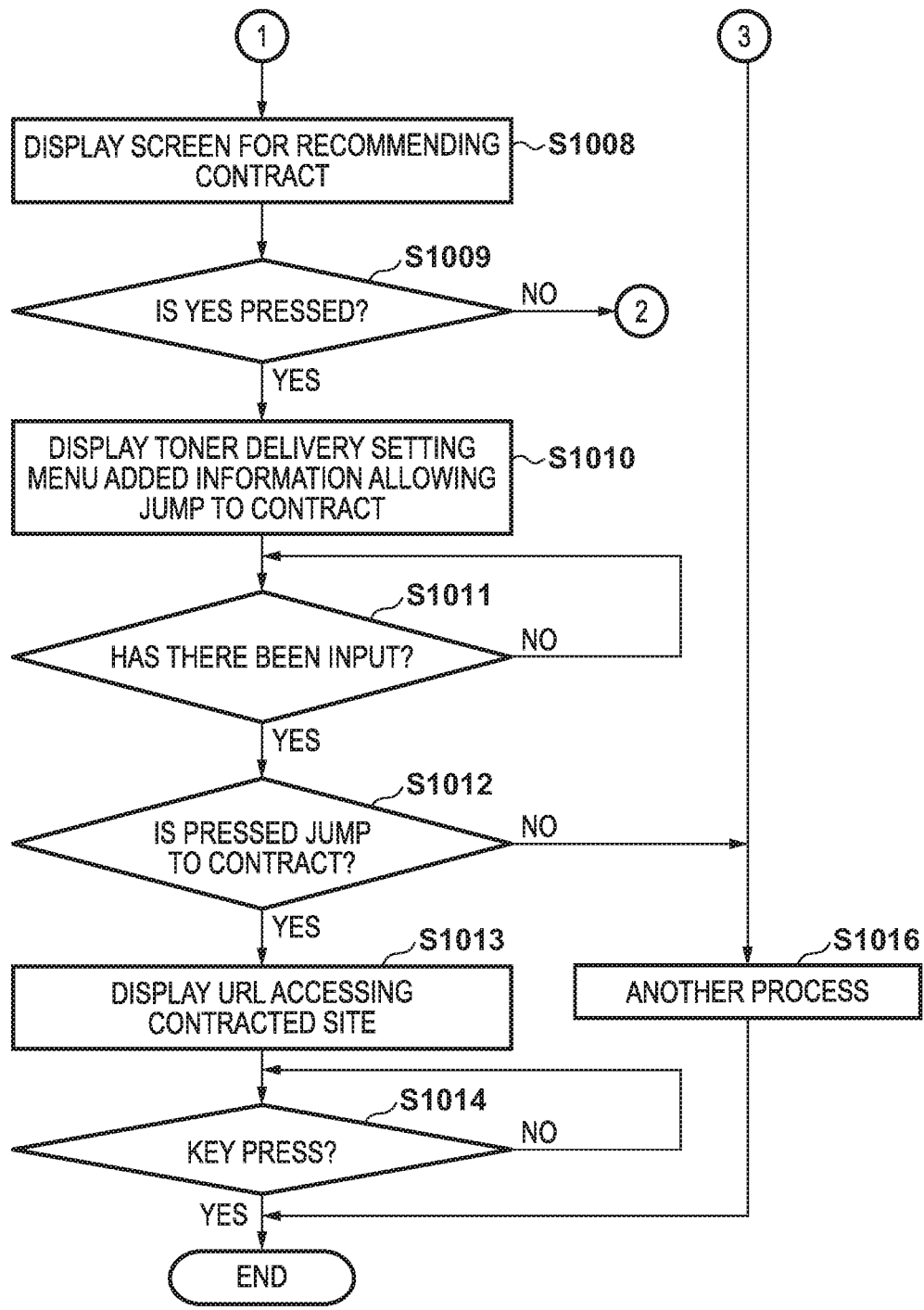

FIGS. 10A and 10B are flowcharts for describing a process when a status confirmation button (on a home screen) of the MFP 101 is pressed according to the embodiment. Note that the process described in the flowchart is achieved when the CPU 111 executes a program deployed in the RAM 113.

In the toner low confirmation process (FIG. 9A) after power on in S603 of FIG. 6, description is given above by using an example in which in a case where toner low is detected, a screen for recommending a toner delivery contract is displayed in step S906, and access to a website where a toner delivery contract can be made is made available in step S908.

In contrast, FIGS. 10A and 10B describes a process up to display of a code for accessing a website where a toner delivery contract can be made, when a status confirmation button of the apparatus is pressed.

Figure 12A:
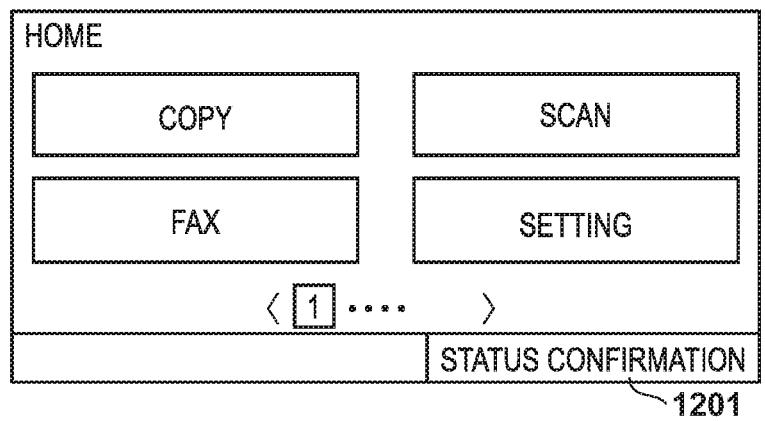
FIGS. 12A to 12D are diagrams illustrating screen examples displayed on a console unit of the MFP according to the embodiment.

In this case, the MFP 101 is in a standby state and displays a home screen as shown in FIG. 12A, for example, on the console unit 116. The home screen includes a status confirmation button 1201 for confirming a status of the MFP 101, as well as buttons for executing functions such as copy and scan. When the status confirmation button 1201 is pressed, the process described in FIGS. 10A and 10B is started.

Figure 12B:
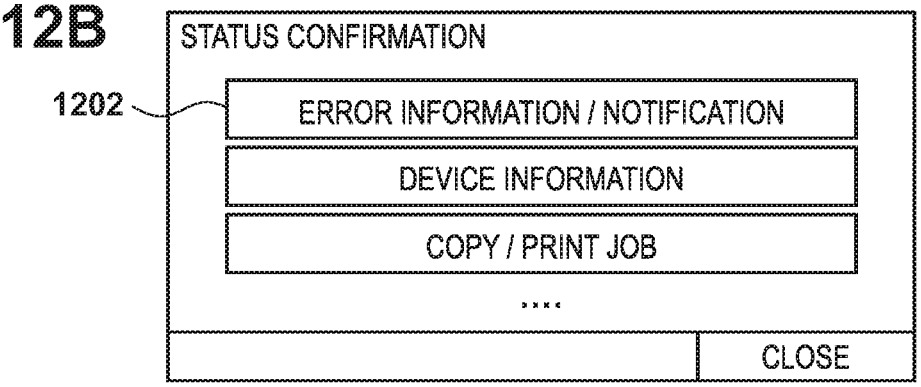

First, in step S1001, the CPU 111 displays a status confirmation menu as shown in FIG. 12B, for example, on the console unit 116. FIG. 12B is a diagram illustrating an example of the status confirmation menu. As the menu, a button 1202 indicating an error information/notification menu is displayed, as well as a menu button indicated by device information and a menu button indicating a copy/print job status.

In step S1001, in a case where any button is pressed on the screen in a state in which the status confirmation menu is displayed, the process proceeds to step S1002, and the CPU 111 determines whether or not the "error information/notification" button 1202 has been pressed. In a case where the "error information/notification" button 1202 is pressed, the process proceeds to step S1003; otherwise, the process proceeds to step S1016.

In step S1003, the CPU 111 determines whether or not toner low, which is a state in which the amount of remaining toner of the MFP 101 is less than a specified value, occurs. Here, in a case where toner low occurs, the process proceeds to step S1004; otherwise, the process proceeds to step S1015. In step S1004, the CPU 111 determines whether or not the toner delivery information 201 of the RAM 113 is set to "deliver toner". Here, in a case where the toner delivery information 201 is set to "deliver toner", the process proceeds to step S1005; otherwise, the process proceeds to step S1015. In step S1005, the CPU 111 determines whether or not or the toner delivery contractual information 202 of the RAM 113 is set to "contracted". Here, in a case where the toner delivery contractual information 202 is not set to "contracted", the process proceeds to step S1006; otherwise, the process proceeds to step S1015. In step S1006, the CPU 111 adds a "toner delivery setting" 1203 (FIG. 12C) to the error information/notification menu, displays the "toner delivery setting" 1203 on the console unit 116, and the process proceeds to step S1007. Note that, in this case, the process of determining whether or not toner low occurs in step S1003 may be omitted; in a case where determination is affirmative in step S1002, the process may proceed to step S1004.

Figure 12C:
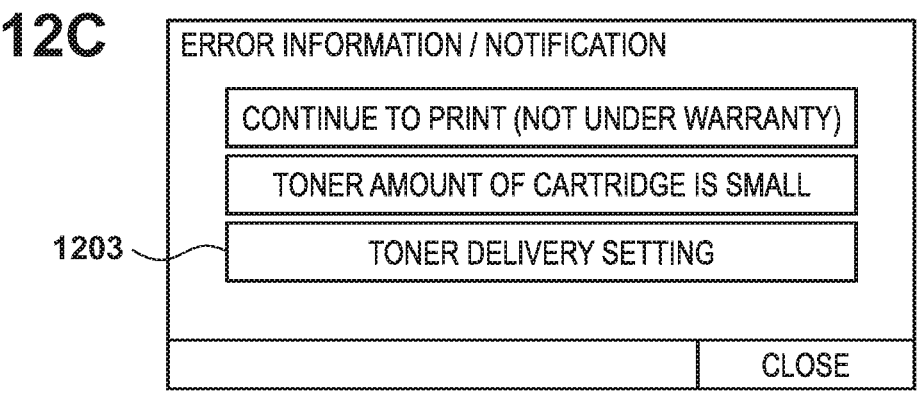

FIG. 12C is a diagram illustrating an example of the error information/notification menu displayed in step S1006. On the error information/notification menu, item buttons for error information and notification at the time point are displayed. In this case, the "toner delivery setting" 1203 is added to the item buttons and displayed. This is for the purpose of recommending a contract of a toner delivery service on the screen of the toner delivery setting, in association with toner low.

Subsequently, in step S1007, the CPU 111 determines whether or not the "toner delivery setting" 1203 has been pressed on the error information/notification menu of FIG. 12C. Here, in a case where the "toner delivery setting" 1203 is pressed, the process proceeds to step S1008; otherwise, the process proceeds to step S1016. In step S1008, the CPU 111 displays a screen (FIG. 12D) for recommending a toner delivery contract on the console unit 116.

Figure 12D:
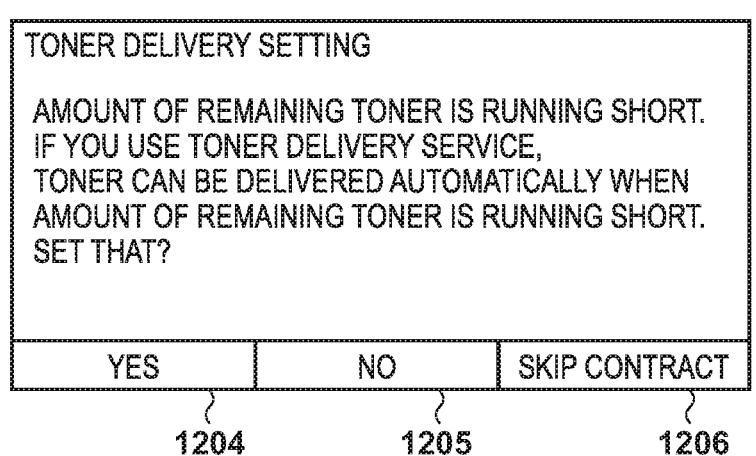

FIG. 12D is a diagram illustrating an example of the screen for recommending a toner delivery contract.

On the screen, a message of recommending a toner delivery contract is displayed, letting the user determine whether or not to proceed to the setting of toner delivery. There are three options of a "Yes" button 1204, a "No" button 1205, and a "skip contract" button 1206.

Then, the process proceeds to step S1009, and the CPU 111 determines whether or not the "Yes" button 1204 has been pressed on the screen for recommending a toner delivery contract of FIG. 12D. Here, in a case where the "Yes" button 1204 is pressed, the process proceeds to step S1010; otherwise, the process proceeds to step S1015. In step S1010, in the toner delivery setting menu, the CPU 111 displays a menu item including information allowing a jump to a website where a toner delivery contract can be made on the console unit 116.

Figure 13A:
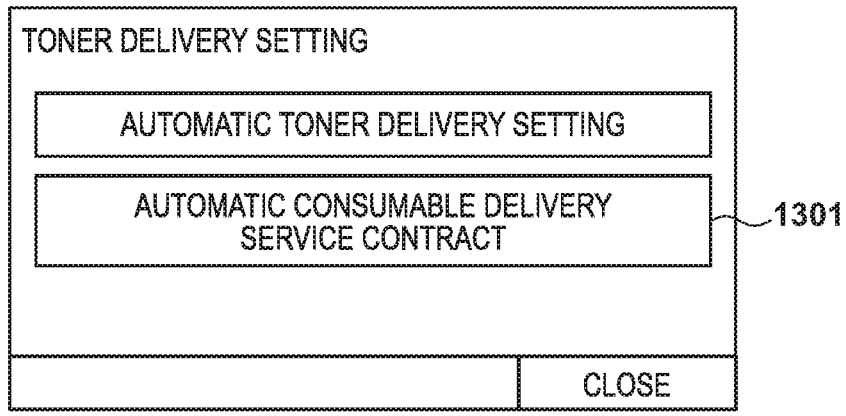
FIGS. 13A to 13C are diagrams illustrating screen examples displayed on the console unit of the MFP according to the embodiment.

FIG. 13A is a diagram illustrating an example of the screen of the automatic toner delivery setting displayed in step S1010.

In this case, an "automatic consumable shipping service contract" 1301 allowing a jump to a website where a toner delivery contract can be made is displayed below the menu for selecting the automatic toner delivery setting.

In this manner, the process proceeds to step S1011, and the CPU 111 determines whether or not there has been an input to the toner delivery setting menu of FIG. 13A displayed in step S1010. In a case where the CPU 111 determines that there is an input, the process proceeds to step S1012, and the CPU 111 determines whether or not the input is to the item allowing a jump to a website where a toner delivery contract can be made. If so, the process proceeds to step S1013; otherwise, the process proceeds to step S1016. In step S1013, the CPU 111 displays a code for accessing a website where a contract can be made. The screen example is illustrated in FIG. 9C, which is the same as that of step S908. A URL of the website where a contract can be made is displayed with the QR code 912. When a user reads the QR code with a smartphone or the like, the user can recognize and access the URL with the smartphone or the like and can thereby make a contract with the toner delivery system. Subsequently, the process proceeds to step S1014, and the CPU 111 waits for a key press to exit from the screen after the use of the QR code. In a case where there is a key press, the process associated with pressing of the status confirmation button is terminated. In step S1015, the CPU 111 performs display on the console unit 116 in a state in which the toner delivery setting is not included in the error information/notification menu.

Figure 13B:
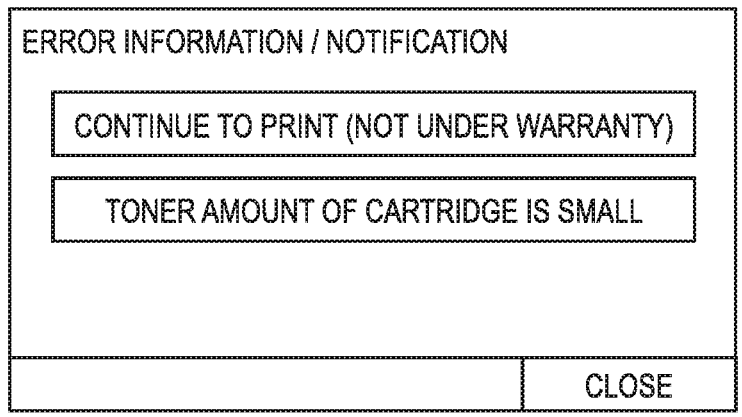

FIG. 13B is a diagram illustrating an example of the error information/notification menu displayed in step S1015.

On the error information/notification menu, item buttons for error information and notification at the time point are displayed. In this case, the "toner delivery setting" 1203 illustrated in FIG. 12C is not included in the item buttons. Then, the process proceeds to step S1016, and the CPU 111 performs another process corresponding to the button specified in the error information/notification menu and terminates the process.

In this manner, when the status confirmation button 1201 of the MFP 101 is pressed, and in a case where a toner delivery contract with the sales company server 102 is not set or in a case where toner low occurs and a toner delivery contract is not set, a screen allowing access to a website where a contract of toner delivery can be made is displayed, and a toner delivery contract can be thereby recommended to a user. Further, access to a website where a contract can be made can be achieved by reading a QR code, and therefore there is an effect of saving user's time and labor for making a toner delivery contract.

Figure 11:
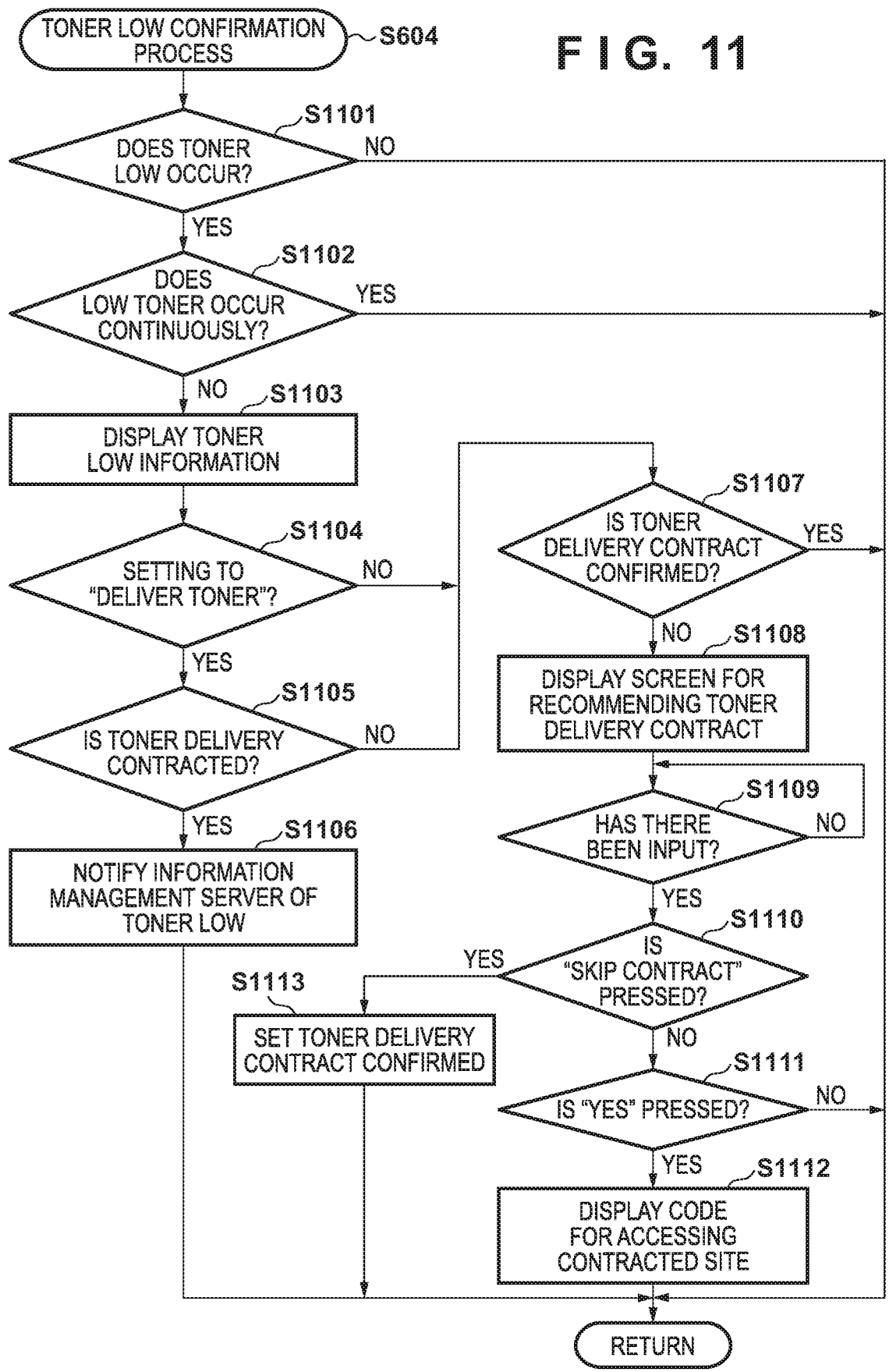
FIG. 11 is a flowchart depicts a view another process of the toner low confirmation process of step S604 of FIG. 6.

FIG. 11 is a flowchart for describing another process of the toner low confirmation process of step S604 of FIG. 6. Note that the process described in the flowchart is achieved when the CPU 111 executes a program deployed in the RAM 113.

In step S1101, the CPU 111 examines whether or not toner low, which is a state in which the amount of remaining toner of the MFP 101 is less than a specified value, occurs. In a case where toner low occurs, the process proceeds to step S1102; otherwise, the process is terminated. In step S1102, the CPU 111 determines whether or not the toner low occurs continuously. Specifically, the CPU 111 checks information of the RAM 113 indicating toner low continuation. In a case where there is information indicating toner low continuation, the CPU 111 determines that the process after occurrence of the toner low has already been executed and terminates the process.

In a case where the toner low does not occur continuously, this means that the toner low has just occurred, thus the process proceeds to step S1103, and the CPU 111 displays the occurrence of toner low on the console unit 116 and sets toner low to the information of the RAM 113 indicating toner low continuation. Next, the process proceeds to step S1104, and the CPU 111 determines whether or not the toner delivery information 201 of the RAM 113 is set to "deliver toner". In a case where the toner delivery information 201 is set to "deliver toner", the process proceeds to step S1105, and the CPU 111 determines whether or not the toner delivery contractual information 202 of the RAM 113 is set to "contracted". Here, in a case where the CPU 111 determines that the toner delivery contractual information 202 is set to "contracted", the process proceeds to step S1106, and since the MFP 101 is on a contract with the toner delivery system, the CPU 111 notifies the information management server 103 of toner low by transmitting the information of toner low and terminates the process. With this operation, the information management server 103 then arranges delivery of toner, based on the toner low information.

On the other hand, in a case where the toner delivery information 201 is not set to "deliver toner" in step S1104 or in a case where the toner delivery contractual information 202 is not set to "contracted" in step S1105, the process proceeds to step S1107. In step S1107, the CPU 111 determines whether or not the toner delivery contractual confirmation information 203 of the RAM 113 is set to "contract intention confirmed". Here, in a case where the toner delivery contractual confirmation information 203 is not set to "contract intention confirmed", the process proceeds to step S1108; otherwise, i.e., in a case where the toner delivery contractual confirmation information 203 is set to "contract intention confirmed", the process is terminated. In step S1108, the CPU 111 displays a screen for recommending a toner delivery contract on the console unit 116, and the process proceeds to step S1109.

Figure 13C:
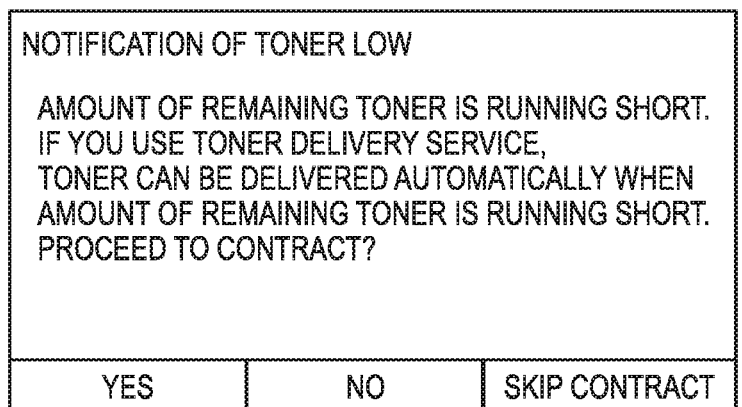

FIG. 13C is a diagram illustrating an example of the screen for recommending a toner delivery contract displayed in step S1108. FIG. 13C depicts a screen in which the "skip contract" button 1206 is added to the screen of FIG. 9B described above.

On the screen, information of a contract is provided, since a contract is not made with the toner delivery system and the system is not available. On the screen, a user can press any one of a "Yes" button 1302, a "No" button 1303, and a "skip contract" button 1304.

In step S1109, the CPU 111 determines whether or not there has been any input on the screen of FIG. 13C. In a case where there is an input, the process proceeds to step S1110, and the CPU 111 determines whether or not the pressed button is the "skip contract" button 1304. In a case where the "skip contract" button 1304 is pressed, the process proceeds to step S1113; otherwise, the process proceeds to step S1111. In step S1111, the CPU 111 determines whether or not the pressed button is the "Yes" button 1302. In a case where the "Yes" button 1302 is pressed, the process proceeds to step S1112, and the CPU 111 displays a code for accessing a website where a contract can be made. The screen displayed in this case is the same as that of FIG. 9C described above. A URL of the website where a contract can be made is displayed with the QR code 912. When a user reads the QR code 912 with a smartphone or the like, the user can recognize and access the URL with the smartphone or the like and can thereby make a contract with the toner delivery system.

On the other hand, in step S1111, in a case where the "Yes" button 1302 is not pressed, in other words, in a case where the "No" button 1303 is pressed, the process is terminated without displaying a code for accessing the website where a contract can be made. In a case where the "skip contract" button 1304 is pressed in step S1110, the process proceeds to step S1113, and the CPU 111 sets "contract intention confirmed" to the toner delivery contractual confirmation information 203 of the RAM 113 and terminates the process. This is a process of storing confirmation of intention of skipping a contract as confirmation information.

In this manner, in a case where a contract of "deliver toner" is not made when toner low occurs in the MFP 101, a screen for recommending a user to make a contract of "deliver toner" can be displayed. In this case, whether or not a user intends to make a contract can be confirmed, and the confirmation result can be stored as the toner delivery contractual confirmation information 203. In this manner, a user who does not desire a toner delivery contract can be prevented from being recommended with repeated display of a screen for recommending the user to make a contract of "deliver toner".

Figure 14:
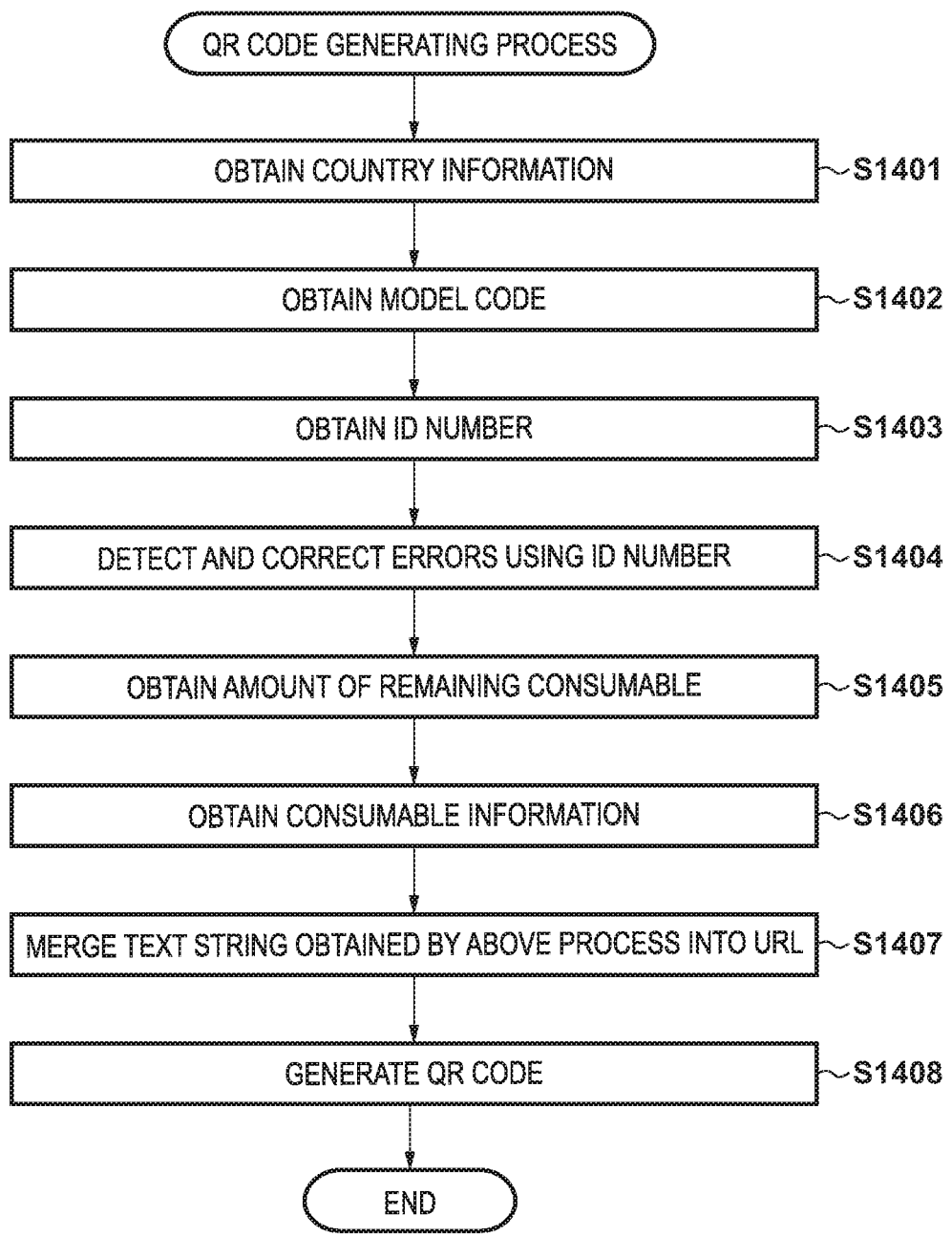
FIG. 14 is a flowchart depicts a view a process of generating a QR code (trade name) in the MFP according to the embodiment.

FIG. 14 is a flowchart for describing a process of generating the QR code 912 in the MFP 101 according to the embodiment. Note that the process described in the flowchart is achieved when the CPU 111 executes a program deployed in the RAM 113. In step S908 of FIG. 9A, the CPU 111 carries out the flowchart when the CPU 111 displays a code for accessing the website of the contractor where a contract can be made.

First, in step S1401, the CPU 111 obtains country information of the MFP 101 stored in the storage 114. The country information is set when a user sets information of a country where the MFP 101 is installed, such as Japan, USA, Canada, Mexico, and Brazil, by using the console unit 116. Next, the process proceeds to step S1402, and the CPU 111 obtains a model code of the MFP 101 stored in the ROM 112. The model code is a model-specific number and is written in the ROM 112 in advance when the product is shipped. Next, the process proceeds to step S1403, and the CPU 111 obtains an ID number stored in the storage 114. The ID number is a number specific to the MFP 101 and is written in the storage 114 in advance when the product is shipped.

Next, the process proceeds to step S1404, and the CPU 111 performs error detection and correction processing, using the ID number obtained in step S1403. In this case, as an example, a cyclic redundancy check is performed to obtain check data. Next, the process proceeds to step S1405, and the CPU 111 obtains the current amount of remaining toner stored in the RAM 113. Next, the process proceeds to step S1406, and the CPU 111 obtains consumable information, such as genuineness information indicating whether or not currently attached toner is a genuine product, based on information of a model number of a cartridge or the like. Then, the process proceeds to step S1407, and the CPU 111 merges values of the country information, the model code, the ID number, the check data, the amount of a remaining consumable, and the consumable information that are obtained in the above process into a URL of the website of the contractor where a contract can be made, as parameters. Then, the process proceeds to step S1408, and the CPU 111 generates a QR code, based on a text string obtained in step S1407, and terminates the process.

Through the process, the QR code 912 is displayed not simply as a URL of the website of the contractor where a contract can be made but is displayed as information in which the information of the MFP 101 is merged as parameters. Note that, in this case, the generated QR code is displayed on the console unit 116 but may be printed by using the print unit 120.

The following embodiment gives description using an example in which a user reads the above QR code with their own mobile terminal 104 to make a toner delivery contract with the sales company.

Figure 15:
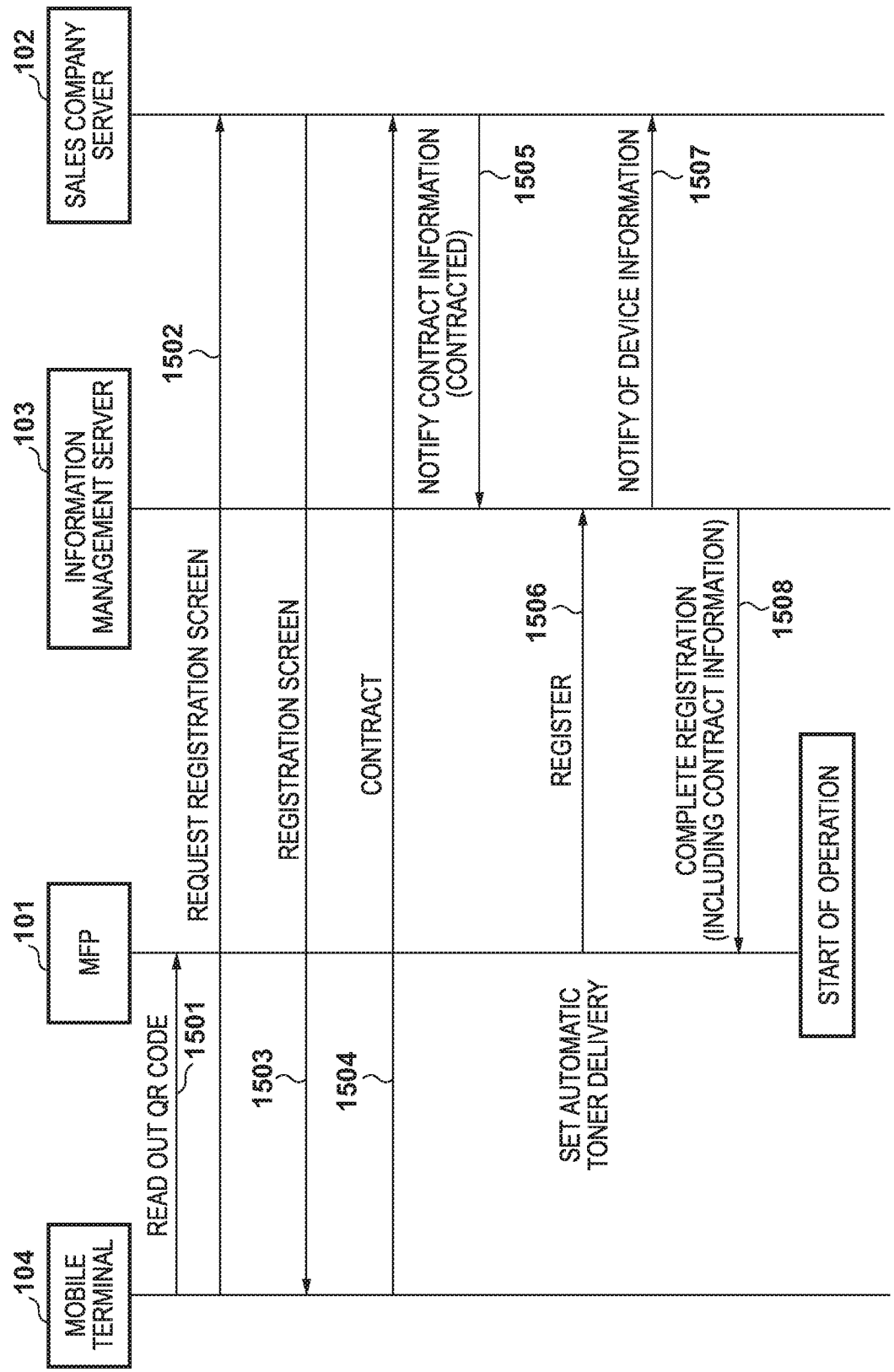
FIG. 15 is a sequence diagram depicts a view a flow of a process in the toner delivery system using a mobile terminal according to the embodiment.

FIG. 15 is a sequence diagram for describing a flow of a process in the toner delivery system using the mobile terminal 104 according to the embodiment. Here, a flow from a contract to the start of operation is illustrated.

Figures 17, 18:
FIG. 17 is a diagram illustrating a print example when a procedure of registering with a toner service including the QR code generated by a sales company server is printed by using a print unit of the MFP according to the embodiment.
FIG. 18 is a diagram illustrating a specific example of parameters included in the QR code generated by the MFP according to the embodiment.

First, in 1501, a user uses the mobile terminal 104 to read the QR code 912 that is generated in the flow of FIG. 14 and that is output and displayed on the console unit 116 of the MFP 101. Note that, in this case, for example, as illustrated in FIG. 17, the QR code 912 printed by the MFP 101 may be read. Next, in 1502, the mobile terminal 104 accesses a URL, as well as information included in the QR code 912. In this case, the URL indicates a URL of the sales company server 102.

In this manner, in 1503, the sales company server 102 then responds to the mobile terminal 104 by transmitting, to the mobile terminal 104, screen information of a registration screen corresponding to the accessed URL. The registration screen is generated by using values of parameters described in the QR code 912 included in a registration screen request transmitted in 1502. The registration screen is displayed on the operation unit 145 of the mobile terminal 104. The registration screen will be described later with reference to FIG. 16. A process of generating the registration screen in the sales company server 102 will be described later with reference to FIG. 19.

Next, in 1504, the user inputs information on the registration screen displayed on the operation unit 145 of the mobile terminal 104 and thereby makes a contract with the toner delivery system. Information of the contract is transmitted to the sales company server 102 and is registered in the sales company server 102. Then, in 1505, the sales company server 102 notifies the information management server 103 of the contract information. The contract information includes information indicating "contracted". The information notified as described above is stored in the information management server 103.

Next, on the MFP 101, the user performs operation of setting automatic toner delivery. The operation of setting automatic toner delivery is in the setting menu of the home screen of the MFP 101 and is performed by setting the item "automatic toner delivery" to "deliver". The detailed process of the MFP 101 when the operation of the automatic toner delivery setting is performed is as described above with reference to FIG. 5.

When "automatic toner delivery" is set to "deliver" as described above, in 1506, the MFP 101 requests the information management server 103 to register automatic toner delivery. The registration includes an ID of the MFP 101.

The information management server 103 that has received the request of the registration stores the registered information in the information management server 103. Then, in 1507, the information management server 103 notifies the sales company server 102 of device information including the ID of the MFP 101 that has been registered. In 1508, the information management server 103 notifies the MFP 101 that registration of automatic toner delivery has completed.

At the time of registration completion, the information management server 103 compares the ID of the MFP 101 notified in the request of the registration in 1506 with data of the information management server 103. The information management server 103 knows whether or not a contract with the MFP 101 has been made, based on the contract information notified from the sales company server 102 in 1505, and therefore the registration completion includes information indicating whether or not a contract has been made. The MFP 101 stores the contract information included in the registration completion and therefore determines whether or not the registered contract information and the registration information of the automatic toner delivery setting match the information included in the registration completion. In a case where these match, an automatic toner delivery contract is made between the MFP 101 and the sales company, and the toner delivery system including the MFP 101 starts operation.

Figure 16:
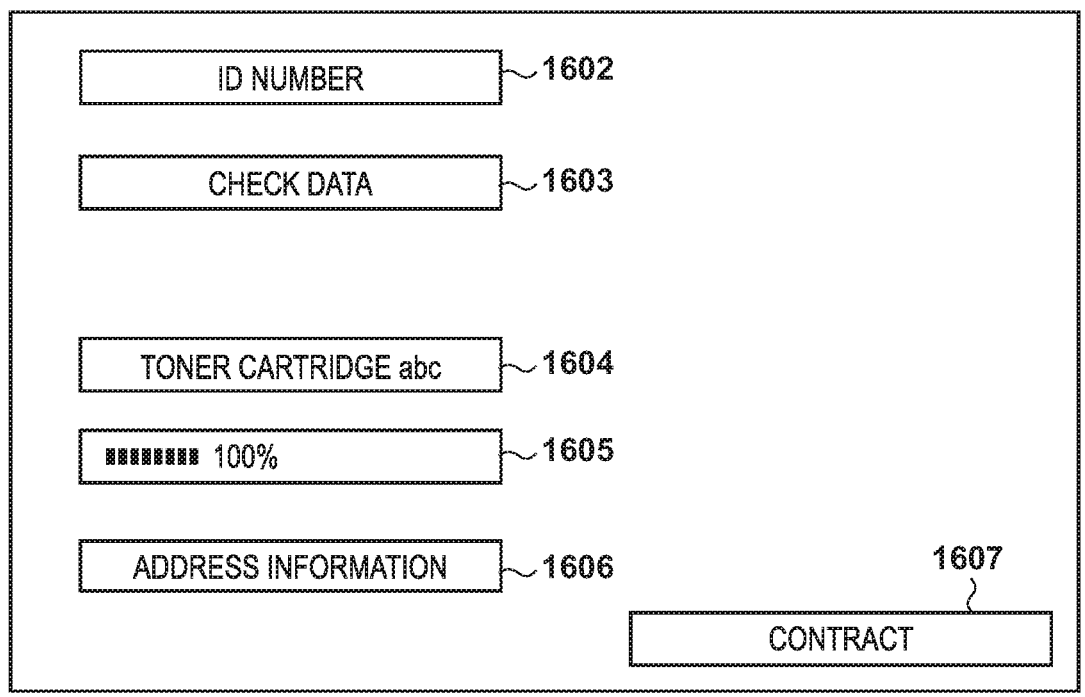
FIG. 16 is a diagram for describing an example of a registration screen displayed on an operation unit of the mobile terminal according to the embodiment.

FIG. 16 depicts a view illustrating an example of the registration screen displayed on the operation unit 145 of the mobile terminal 104 according to the embodiment. The screen is generated by the sales company server 102 and is transmitted to the mobile terminal 104 in 1503 of FIG. 15 and displayed.

The sales company server 102 receives country information generated in the process described in the flowchart of FIG. 14 from the mobile terminal 104 as a parameter included in the QR code and changes a language and a screen layout displayed on the screen. In an ID number field 1602, the ID number obtained in step S1403 of FIG. 14 is displayed. In a check data field 1603, the check data generated in step S1404 of FIG. 14, such as a checksum, is displayed. Although the values in the ID number field 1602 and the check data field 1603 can be changed by a user using the operation unit 145, user's time and labor can be saved in a case where the values generated in the flowchart of FIG. 14 are transferred. In a toner information field 1604, a model number and a name of toner, which are determined based on the model code of the MFP 101 obtained in step S1402 of FIG. 14 and the values of the consumable information obtained in step S1406, are displayed. In an amount of remaining toner display field 1605, the value of the information of the amount of remaining toner obtained in step S1405 of FIG. 14 is displayed. In an address information field 1606, the user of the mobile terminal 104 inputs an address to which toner is delivered, by using the operation unit 145. Then, when the user presses a contract button 1607, as described in 1504 of FIG. 15, the information input on the screen is transmitted to the sales company server 102, and the user can proceed to a process of making an automatic toner delivery contract between the MFP 101 and the sales company.

FIG. 17 depicts a view illustrating a print example when a procedure of registering with a toner service including the QR code 912 generated by the sales company server 102 is printed by using the print unit 120 of the MFP 101 according to the embodiment.

FIG. 18 is a diagram for describing a specific example of parameters included in the QR code 912 generated by the MFP 101 according to the embodiment.

In country information 1801, information indicating a country is stored. In the present example, "USA" indicating United States of America is stored. A model code 1802 is a model-specific number indicating a model of the MFP 101. In this case, "MFP123" is stored. An ID number 1803 is an identification number specific to the MFP 101. In this case, "AAA0000123" is stored. Check data 1804 is a 4-digit number indicating a result obtained by performing error correction processing on the ID number "AAA0000123". In this case, "1234" is stored. An amount of a remaining consumable 1805 is a value indicating the amount of remaining toner of the MFP 101, and any one of FULL (the amount of remaining toner is sufficient), LOW (the amount of remaining toner is low), and OUT (there is no amount of remaining toner) is stored. In this case, FULL is stored. Consumable information 1806 is a value indicating whether or not toner currently attached to the MFP 101 is a genuine product. "1" is stored in a case where the toner is a genuine product, and "0" is stored in a case where the toner is not a genuine product. In this case, "1" indicating a genuine product is stored.

Figure 19:
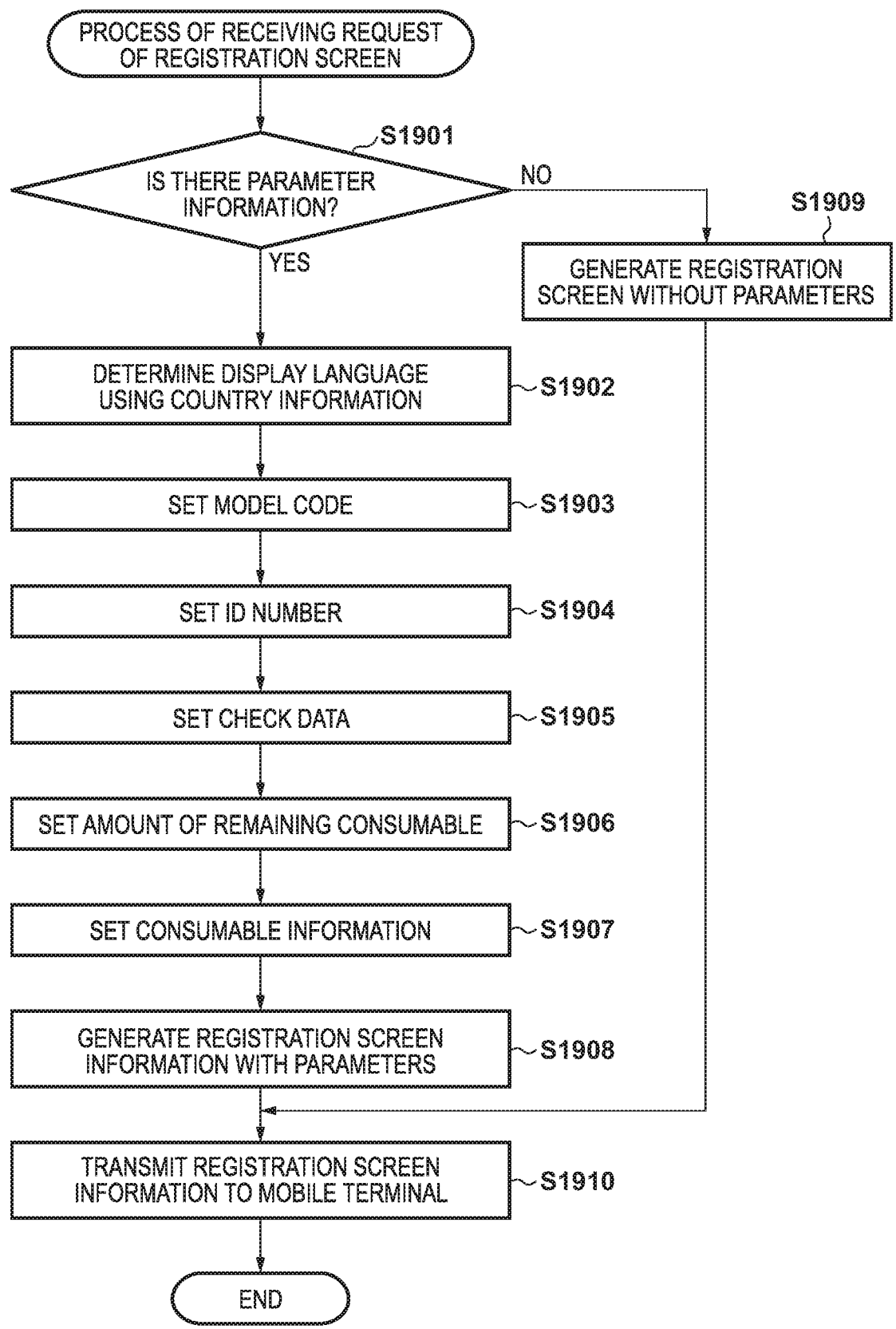
FIG. 19 is a flowchart for describing a process when the sales company server receives a request of a registration screen from the mobile terminal, according to the embodiment.

FIG. 19 is a flowchart for describing a process when the sales company server 102 receives a request of a registration screen from the mobile terminal 104, according to the embodiment. Note that the process described in the flowchart is achieved when a CPU (not illustrated) of the sales company server 102 executes a program stored in a memory (not illustrated).

First, in step S1901, the CPU determines whether or not parameters are attached to the registration screen request from the mobile terminal 104. Here, in a case where the mobile terminal 104 accesses a website of the sales company server 102 by reading the QR code 912, parameters are attached to the registration screen request. However, in a case where the user accesses the website with the mobile terminal 104 simply by inputting a URL of the website, parameters are not attached to the registration screen request. Accordingly, in a case where the CPU determines that the parameters are not attached, the process proceeds to step S1909, and the CPU generates a registration screen without parameters, transmits the registration screen to the mobile terminal 104 in step S1910, and terminates the process.

On the other hand, in step S1901, in a case where the CPU determines that the parameters are attached, the process proceeds to step S1902, the CPU confirms the country information 1801 and selects a corresponding language as a display language of the registration screen. Next, the process proceeds to step S1903, the CPU sets the model code 1802 to the registration screen, and the process proceeds to step S1904. In step S1904, the CPU sets the ID number 1803 to the registration screen, and the process proceeds to step S1905. In step S1905, the CPU sets the check data 1804 to the registration screen, and the process proceeds to step S1906. In step S1906, the CPU creates display data corresponding to the amount of a remaining consumable 1805 and sets the display data to the registration screen. Next, the process proceeds to step S1907, and the CPU creates display data corresponding to the consumable information 1806 and sets the display data to the registration screen. In this manner, in step S1908, the CPU generates registration screen information with parameters, transmits the registration screen information to the mobile terminal 104 in step S1910, and terminates the process.

Figure 20:
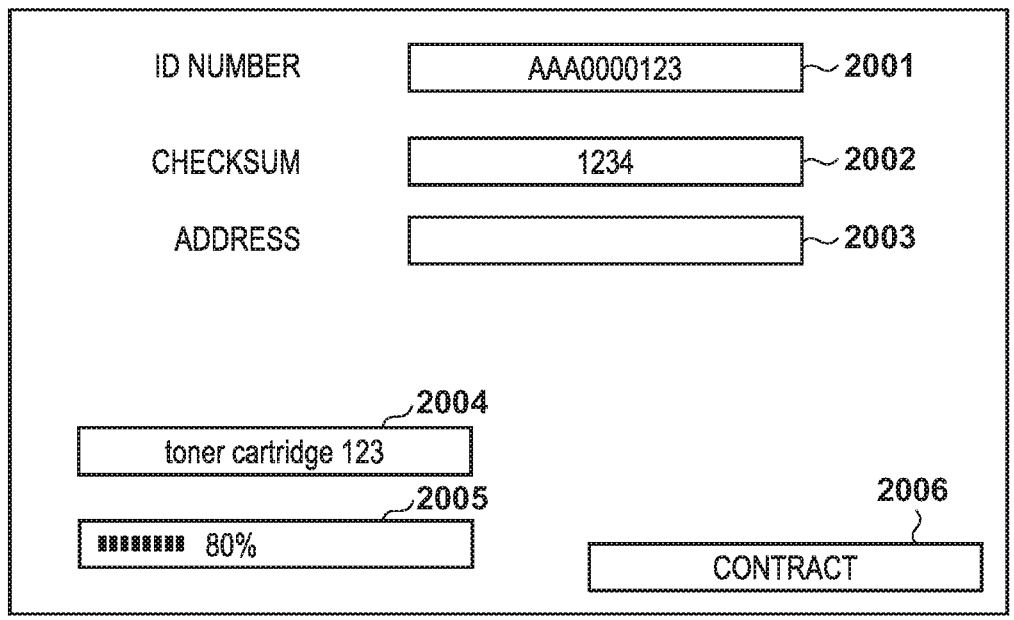
FIG. 20 is a diagram illustrating an example of a screen of a registration screen with parameters, which is created by the sales company server in the process described in the flowchart of FIG. 19 and is displayed on the operation unit of the mobile terminal.

FIG. 20 depicts a view illustrating an example of a screen of the registration screen with parameters, which is created by the sales company server 102 in the process illustrated in the flowchart of FIG. 19 and is displayed on the operation unit 145 of the mobile terminal 104.

The registration screen is displayed in a language corresponding to the country information 1801 of FIG. 18. In this case, the registration screen is displayed in English, corresponding to USA. An ID number field 2001 and a check data field 2002 are displayed, with values corresponding to the ID number 1803 and the check data 1804 of FIG. 18 being set. In this case, an address field (address) 2003 is blank. In a toner information display field 2004, the model number of toner indicated in the toner information field 1604 illustrated in FIG. 16 is displayed. In an amount of remaining toner display field 2005, the amount of remaining toner of the MFP 101 at the time point is displayed. In this case, when the user presses a contract button 2006, the information input on the screen is notified to the sales company server 102 from the mobile terminal 104.

In this manner, the registration screen to which information of the MFP 101 necessary for making a contract of toner delivery, such as the ID of the MFP 101 and the model number of the toner cartridge, is input in advance is displayed on the operation unit 145 of the mobile terminal 104. Thus, in the screen example of FIG. 20, for example, the user can provide information necessary for making a toner delivery contract for the sales company server 102, simply by inputting an address and pressing the contract button 2006.

Figure 21:
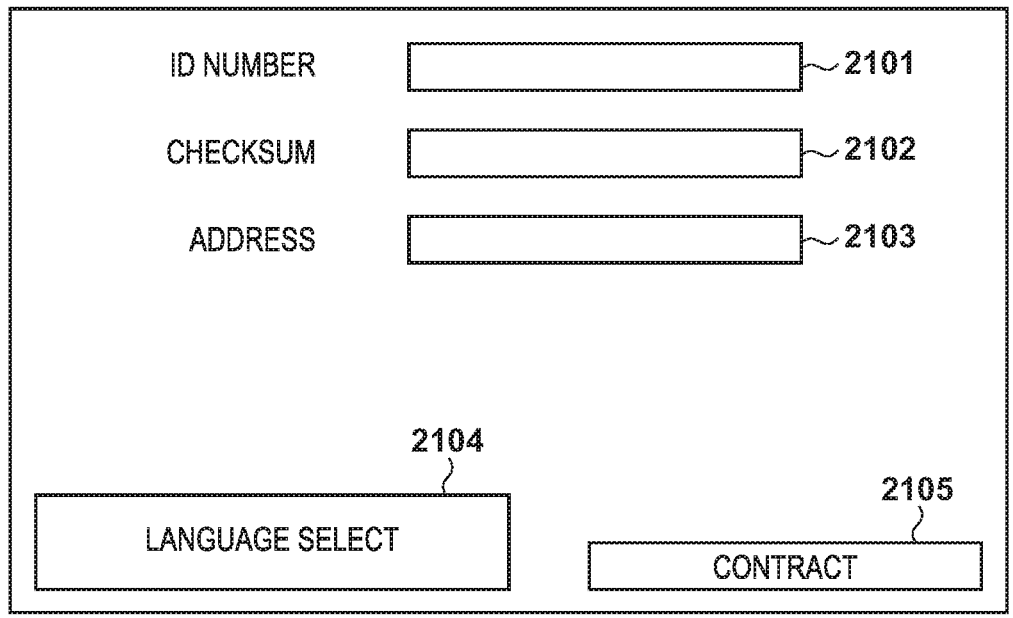
FIG. 21 is a diagram illustrating an example of a registration screen without parameters, which is created by the sales company server in the process described in the flowchart of FIG. 19 and is displayed on the operation unit of the mobile terminal.

FIG. 21 depict a view illustrating an example of the registration screen without parameters, which is created by the sales company server 102 in the process illustrated in the flowchart of FIG. 19 and is displayed on the operation unit 145 of the mobile terminal 104. The registration screen without parameters is displayed in a predetermined language. In this case, an example of display in Japanese is illustrated. The screen is created when the process proceeds from step S1901 to step S1909 in FIG. 19.

On the screen, the user can change the display language to a desired language by pressing a language select button 2104. FIG. 21 illustrates a case of display in Japanese, as default display. An ID number field 2101, a check data field 2102, and an address field 2103 are displayed as blank fields. When the user inputs necessary information on the screen and then presses a contract button 2105, the information input on the screen is notified to the sales company server 102 from the mobile terminal 104.

After a toner delivery contract is made in this manner, as described in the sequence diagram of FIG. 4, for example, toner is automatically delivered to the user of the MFP from the sales company when toner low occurs in the MFP.

As described above, according to the embodiment, with a mobile terminal operated by a user, a toner delivery contract for a printing apparatus used by the user can be made. In the toner delivery contract, when the mobile terminal reads a code including information necessary for making a toner delivery contract, time and labor for inputting such information can be saved.

When toner low occurs in the printing apparatus, a screen for recommending a contract of automatic toner delivery can be displayed for the user, in a case where a toner delivery contract has not been made. Then, a code for accessing a website where an automatic toner delivery contract can be made is presented to the user who agreed on making the contract. In this manner, the user can make a contract of automatic toner delivery by using the code. In this manner, effects of increasing the number of users of an automatic order and delivery system for a consumable and enhancing convenience for contracted users can be achieved.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefits of Japanese Patent Application No. 2019-005423, filed Jan. 16, 2019 and Japanese Patent Application No. 2019-079566, filed Apr. 18, 2019, which are hereby incorporated by references herein in their entirety.

What is claimed is:

1. A delivery system including an image forming apparatus that forms an image on a sheet using a consumable, a mobile terminal, and a server for providing a delivery service for delivering the consumable,
wherein the image forming apparatus comprises:
a first display that displays information; and
one or more first controllers configured to:
    cause the first display to display a message that recommends a contract of the delivery service and a two-dimensional bar code based on information of a Uniform Resource Locator (URL) of a web site of the server in a case where a low remaining state of the consumable, in which a remaining amount of the consumable that is being used in the image forming apparatus becomes lower than a predetermined amount, occurs in a state where the contract is not performed; and
    notify the server of consumable information in a case where the low remaining state of the consumable that is being used in the image forming apparatus occurs in a state where the contract is performed,
wherein the mobile terminal comprises:
a camera;
a second display that displays information; and
one or more second controllers configured to:
    cause the camera to capture the two-dimensional bar code displayed on the first display to obtain the URL, access the server based on the obtained URL to obtain screen information of a registration screen for inputting contract information of the delivery service, cause the second display to display the registration screen based on the screen information, and cause a user to input the contract information in the registration screen, wherein the contract information includes at least identification information of the image forming apparatus, and
wherein the server comprises:
one or more third controllers being configured to:
    send the screen information to the mobile terminal in response to the access from the mobile terminal;
    make the contract with a user of the image forming apparatus based on the contract information input in the registration screen; and
    decide to deliver a new consumable to the user of the image forming apparatus based on the contract information obtained via the web site and the notified consumable information.

2. The delivery system according to claim 1, wherein the one or more first controllers are further configured to:
cause the first display to display the message and the two-dimensional bar code in accordance with a predetermined button having been pressed on a screen in a state where the low remaining state of the consumable that is being used in the image forming apparatus occurs and the contract is not performed.

3. The delivery system according to claim 1, wherein the one or more first controllers are further configured to:
cause the first display to display a screen including a button for prompting the user of the image forming apparatus to make the contract of the delivery service in a case that the contract is not performed.

4. A delivery system including an image forming apparatus that forms an image on a sheet using a consumable, a mobile terminal, and a server for providing a delivery service for delivering the consumable,
wherein the image forming apparatus comprises:
an image forming device that prints an image on a sheet;
one or more first controllers being configured to:
cause the image forming device to print a report including a message that recommends the contract of the delivery service and a two-dimensional bar code based on information of a Uniform Resource Locator (URL) of a web site of the server in a case where a low remaining state of the consumable, in which a remaining amount of the consumable that is being used in the image forming apparatus becomes lower than a predetermined amount, occurs in a state where the contract is not performed; and
notify the server of consumable information in a case where the low remaining state of the consumable that is used in the image forming apparatus occurs in a state where the contract is performed,
wherein the mobile terminal comprises:
a camera;
a display that displays information; and
one or more second controllers being configured to:
cause the camera to capture the two-dimensional bar code on the report to obtain the URL access the server based on the obtained URL to obtain screen information of a registration screen for inputting contract information of the delivery service, cause the display to display the registration screen based on the screen information, and cause a user to input the contract information in the registration screen, wherein the contract information includes at least identification information of the image forming apparatus, and
wherein the server comprises:
one or more third controllers being configured to:
send the screen information to the mobile terminal in response to the access from the mobile terminal;
make the contract with a user of the image forming apparatus based on the contract information input in the registration screen; and
decide to deliver a new consumable to the user of the image forming apparatus based on the contract information and the notified consumable information.

5. The delivery system according to claim 4, wherein the one or more first controllers are further configured to:
cause the image forming device to print the report including the message and the two-dimensional bar code in accordance with a predetermined button having been pressed on a home screen in a state where the low remaining state of the consumable that is being used in the image forming apparatus occurs and the contract is not performed.

6. The delivery system according to claim 4, wherein the one or more first controllers are further configured to:
cause the first display to display a screen including a button for prompting the user of the image forming apparatus to make the contract of the delivery service in a case that the contract is not performed.

7. An image forming apparatus for forming an image on a sheet using a consumable and being operable to receive a delivery service for delivering the consumable, the image forming apparatus comprising:
a display that displays information; and
one or more controllers being configured to:
cause the display to display a message that recommends the contract of the delivery service and a two-dimensional bar code based on information of a Uniform Resource Locator (URL) of a web site of a server for performing the contract of the delivery service in a case where a low remaining state of the consumable, in which a remaining amount of the consumable that is being used in the image forming apparatus becomes lower than a predetermined amount, occurs in a state where the contract is not performed;
cause the display to display the message and the two-dimensional bar code in accordance with a predetermined button having been pressed on a screen in a state where the low remaining state of the consumable that is being used in the image forming apparatus occurs and the contract is not performed; and
notify the server of consumable information in a case where the low remaining state of the consumable that is being used in the image forming apparatus occurs in a state where the contract is performed.

8. The image forming apparatus according to claim 7, wherein the one or more controllers are further configured to:
cause the display to display a screen for prompting a user to perform the contract of the delivery service in a case where the low remaining state of the consumable that is being used in the image forming apparatus occurs in a state in which the contract of the delivery service is not performed.

9. The image forming apparatus according to claim 8, wherein the screen includes information indicating that the remaining amount of the consumable is less than the predetermined amount.

10. The image forming apparatus according to claim 8, wherein the screen includes a selectable object for causing the display to display the two-dimensional bar code.

11. The image forming apparatus according to claim 8, wherein the contract of the delivery service includes at least one of that contract information has been input in the web site of the server and that the image forming apparatus holds contract information of a user that makes use of the delivery service.

12. The image forming apparatus according to claim 11, wherein the contract information includes at least one of a serial number, a checksum and an address of the user.

13. The image forming apparatus according to claim 7, wherein the one or more controllers further generates the two-dimensional bar code using the information of the URL and parameter information.

14. The image forming apparatus according to claim 13, wherein the parameter information includes at least one of country information, identification information of the image forming apparatus, the remaining amount of the consumable that is being used, and identification information of the consumable that is being used.

15. The image forming apparatus according to claim 7, wherein the one or more controllers are further configured to:
cause the display to display a screen including a button for prompting a user of the image forming apparatus to make the contract of the delivery service in a case that the contract is not performed.

16. An image forming apparatus for forming an image on a sheet using a consumable and being operable to receive a delivery service for delivering the consumable, the image forming apparatus comprising:
an image forming device that prints an image on a sheet;
one or more controllers configured to:
cause the image forming device to print a report including a two-dimensional bar code based on information of a Uniform Resource Locator (URL) of a web site of a server for performing a contract of the delivery service in a case where a low remaining state of the consumable, in which a remaining amount of the consumable that is being used in the image forming apparatus becomes lower than a predetermined amount, occurs in a state where a contract of the delivery service is not performed;
cause the image forming device to print the report including the two-dimensional bar code in accordance with having a predetermined button been pressed on a screen in a state where the low remaining state of the consumable that is being used in the image forming apparatus occurs and the contract is not performed; and
notify the server of consumable information in a case where the low remaining state of the consumable that is being used in the image forming apparatus occurs in a state where the contract is performed.

17. The image forming apparatus according to claim 16, wherein the one or more controllers are further configured to:
cause a display to display a screen for prompting the user to perform a contract of the delivery service in a state where the low remaining state of the consumable that is being used in the image forming apparatus occurs in a state in which the contract of the delivery service is not performed.

18. The image forming apparatus according to claim 17, wherein the screen includes information for notifying that the remaining amount of the consumable is less than the predetermined amount.

19. The image forming apparatus according to claim 17, wherein the screen includes a selectable object for causing the display to display the two-dimensional bar code.

20. The image forming apparatus according to claim 17, wherein the contract of the delivery service includes at least that contract information has been input in the web site.

21. The image forming apparatus according to claim 20, wherein the contract information includes at least one of a serial number, a checksum and an address of the user.

22. The image forming apparatus according to claim 17, wherein the contract of the delivery service includes at least that the image forming apparatus holds contract information of a user that makes use of the delivery service.

23. The image forming apparatus according to claim 16, wherein the one or more controllers further generates the two-dimensional bar code using the information of the URL and parameter information.

24. The image forming apparatus according to claim 23, wherein the parameter information includes at least one of country information, identification information of the image forming apparatus, the remaining amount of the consumable that is being used, and identification information of the consumable that is being used.

25. The image forming apparatus according to claim 16, wherein the consumable includes toner provided with a process cartridge.

* * * * *